United States Patent
Chang et al.

(10) Patent No.: US 10,560,183 B2
(45) Date of Patent: Feb. 11, 2020

(54) DATA TRANSPORT PRIVACY AND REDUNDANCY VIA SMALL UAVS IN COOPERATION

(71) Applicant: SPATIAL DIGITAL SYSTEMS, INC., Agoura Hills, CA (US)

(72) Inventors: Donald C. D. Chang, Thousand Oaks, CA (US); Juo-Yu Lee, Westlake Village, CA (US)

(73) Assignee: SPATIAL DIGITAL SYSTEMS, INC., Agoura Hills, CA (US)

( * ) Notice: Subject to any disclaimer, the term of this patent is extended or adjusted under 35 U.S.C. 154(b) by 29 days.

(21) Appl. No.: 16/018,089

(22) Filed: Jun. 26, 2018

(65) Prior Publication Data

US 2019/0020403 A1    Jan. 17, 2019

Related U.S. Application Data

(63) Continuation of application No. 14/793,684, filed on Jul. 7, 2015, now Pat. No. 10,009,091.

(51) Int. Cl.
    *H04B 7/185*    (2006.01)

(52) U.S. Cl.
    CPC ..... *H04B 7/18506* (2013.01); *H04B 7/18504* (2013.01)

(58) Field of Classification Search
    None
    See application file for complete search history.

(56) References Cited

U.S. PATENT DOCUMENTS

| | | | |
|---|---|---|---|
| 2017/0025751 A1* | 1/2017 | White | H01Q 3/04 |
| 2018/0033312 A1* | 2/2018 | DeLuca | G08G 5/0008 |
| 2018/0174472 A1* | 6/2018 | Rodenbeck | B64C 39/024 |
| 2019/0261152 A1* | 8/2019 | Weinfield | B64C 39/024 |

FOREIGN PATENT DOCUMENTS

WO    WO-2017019595 A1 *   2/2017   ........... B64C 39/024

* cited by examiner

*Primary Examiner* — Otis L Thompson, Jr.
(74) *Attorney, Agent, or Firm* — Phuong-Quan Hoang

(57) ABSTRACT

A communication system includes (1) a first airborne linear array configured to project a first fan beam over a first ground coverage elongated in a first direction, the first fan beam delivering a first information data associated with a first data stream; and (2) a second airborne linear array configured to project a second fan beam over a second ground coverage elongated in a second direction, the second fan beam delivering a second information data associated with a second data stream. The first and second ground coverages are overlapped to form a common coverage area. The first and second data streams are complementary to each other and are linear combinations of a plurality of segmented substreams. The plurality of segmented substreams is formed from an information data stream. The first and second data streams are generated from a ground control facility.

20 Claims, 19 Drawing Sheets

DATA TRANSPORT PRIVACY AND REDUNDANCY VIA SMALL UAVS IN COOPERATION

RELATED APPLICATIONS

This application is a continuation of application Ser. No. 14/793,684, filed on Jul. 7, 2015.

This application is related to incoherent wavefront multiplexing and wavefront demultiplexing techniques:
  a. a U.S. patent application Ser. No. 12/848,953, filed on Aug. 2, 2010, entitled "Novel Karaoke and data recording/transmission techniques via WF muxing and demuxing,"
  b. a U.S. patent application Ser. No. 15/525,315, filed on Jun. 17, 2012, entitled "Systems for processing data streams,"
  c. a U.S. patent application Ser. No. 13/953,715 filed on Jul. 29, 2013, entitled "WF muxing and demuxing for cloud data storage and transport."

All of the above are incorporated herein by reference in their entireties.

This application is also related to communications via deployed UAVs:
  a. a U.S. patent application Ser. No. 14/182,665, filed on Feb. 18, 2014, entitled "Multi-user MIMO via frequency re-use in smart antenna,"
  b. a U.S. patent application Ser. No. 14/193,540, filed on Feb. 28, 2014, entitled "Multi-user MIMO via active scattering platforms,"
  c. a U.S. patent application Ser. No. 14288707, "filed on May 28, 2014 Active scattering for bandwidth enhanced MIMO."

All of the above are incorporated herein by reference in their entireties.

DESCRIPTION

Proposed communications systems via UAVs in cooperation featuring linear arrays on sky can provide data transport services with enhanced privacy and survivability, including delivery of information for selected users, and dissemination of information to users in public.

Antennas generally provide two functions; one to enable wireless connectivity and the other to generate spatial discriminations. A fleet of 100 identical small UAVs flying in a square lattice formation can become a distributed array antenna with a 2-D "full" aperture in sky. Assuming 1-meter wingtip-to-wingtip span in each of the small UAVs, the dynamic aperture may be used to form multiple beams, each with an angular coverage near its boresight with a small cone angle α projected on ground, where α is inversely proportional to operational frequency. The dimension of the aperture in the direction with wingtip-to-wingtip connected 10 UAVs corresponds to ~80 wavelengths at 2.5 GHz for a 0.8° beamwidth, or 8 wavelengths at 250 MHz for an 8° beamwidth. For telecommunications, a cooperative unmanned aerial systems (UAS) with 2 sets of (1*10) UAVs with our proposed techniques, sending complimentary messages to two arms of a "cross" coverage, will provide the same discrimination capability of the above mentioned full aperture comprised of 100 UAVs.

BACKGROUND

Figure 1:
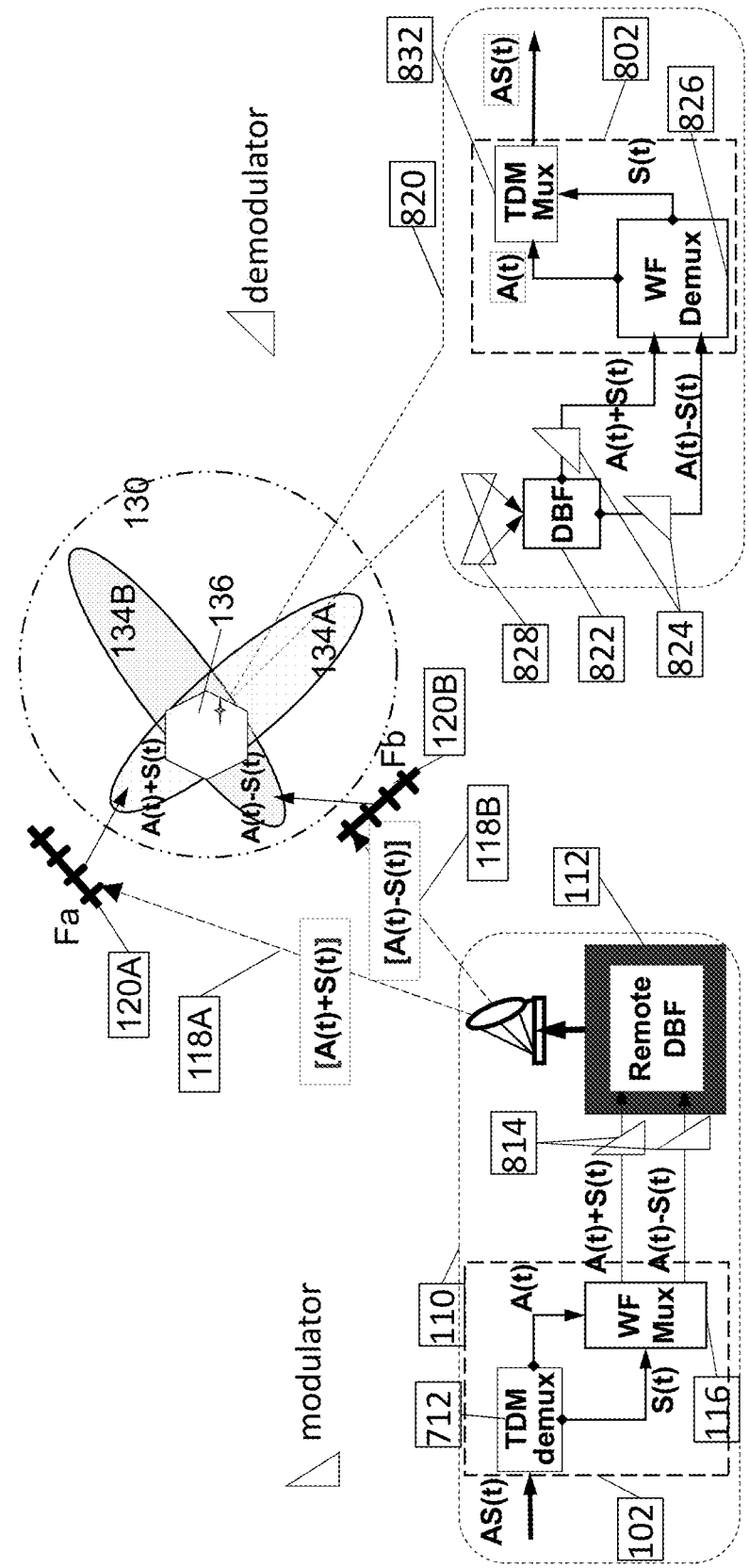
FIG. 1 illustrates a communications system via a UAS by clusters of UAVs forming two linear arrays on sky for forward link data transport as parts of embodiments of this invention.

This invention is related to communications architectures via cooperative unmanned aerial vehicles (UAVs). Depicted in FIG. 1 is an operation scenario with two groups of unmanned aerial vehicles (UAVs) to services as communications relays between a ground hub in a background and users in foreground. There are three segments; the airborne segment, the ground control segments and user segments. The same segments may also be arranged for communicating architectures among desired terminals in foreground via a communications hub in background independently and concurrently with better privacy and survivability in data transport.

SUMMARY OF THE INVENTION

This disclosure on communications systems is summarized as followed:

Communications channels from a source to multiple destinations are through active transponding from many distributed UAVs. These UAVs are grouped into multiple clusters and are flying in a formation in each cluster which shall function as an array antenna capable to form multiple concurrent beams. These clusters may normally be separated among one another by 10 s km or larger; be placed at an altitude of less than 5 Km or higher than 20 Km. They may also be placed in door, and separated in the orders of meters, or 10 s of meters.

Each beam shall service a unique coverage area. Coverages from various arrays in sky can be centered to different directions with slightly overlapped service area. For a given user at a destination in a common or overlapped coverage area of these arrays in sky, there shall be multiple possible links to the source through multiple clusters of UAVs. The communications between the source and the targeted users will take advantage of these links to achieve better privacy and survivability.

Suppose we use a dynamic architecture with 2 clusters of flying UAVs to form two linear arrays, each projecting an elongated radiation and receiving patterns with a beamwidth of $1°×10°$. The projected pattern by the first group, F1, is along a north-south (NS) direction, and that for the second group, F2, is along an East-West (EW) direction. Furthermore, these fan beams are designed to form a "cross" of "X" in coverage. Thus, a common coverage is formed, over which desired subscribers are resided.

A data stream AS(t) from the source shall go through a preprocess which segmenting AS(t) into two substreams A(t) and S(t), and then wavefront multiplexing (WF muxing) the two substreams into two WF muxed substreams K1(t) and K2(t); where K1(t)=A(t)+S(t) and K2(t)=A(t)−S(t). At a destination, a user may receive both K1(t) and K2(t); through a WF demuxing to recover A(t) and S(t), and then to reconstitute the AS(t) by a corresponding de-segmenting process.

We will send K1(t) via the Fa cluster, and K2(t) via the Fb cluster to facilitate the feature of "spatial discriminations". Only subscribers in the common coverage area can access K1(t) and K2(t) both. Subscribers in the "cross" other than the common coverage area can only access one of K1(t) and K2(t), and they are unable to reconstitute S(t); normally.

WF muxing may also be called K-muxing or simply Kmuxing in this application, because signal processing for wavefront multiplexing are in a K-space, a wave-number space, or a directional space.

The associated beam forming mechanisms for an array in sky are not on-board but remotely on a ground based, sea based, or airborne moving platform or in a fixed facility on ground. The remote beam forming implementations become possible and efficient due to two technologies; digital beam forming (DBF) to form multiple beams, wavefront multiplexing (WF Muxing) for efficient backchannel calibrations.

Suppose we modify the dynamic architecture of the 2 clusters of flying UAVs to 3 clusters of flying UAVs forming three linear arrays, each projecting an elongated radiation and receiving patterns with a beamwidth of $1°×10°$ in a different embodiment. The projected pattern by the first group, Fa, is along a north-south (NS) direction, that for the second group, Fb, is along an East-West (EW) direction, and that for the third group, Fc, is along a Southeast-Northwest (SE-NW) direction. Furthermore, these fan beams are designed to form crossovers in coverage. Thus, a common coverage area is formed, over which desired subscribers are resided.

A data stream S(t) from the source shall go through a preprocess which segmenting AS(t) into two substreams A(t) and S(t), and then wavefront multiplexing (WF muxing) the two substreams into two WF muxed substreams K1(t), K2(t), and K3(t); where K1(t)=A(t)+S(t), K2(t)=A(t)−S(t), and K3(t)=2A(t)−S(t). At a destination, a user may receive any two of K1(t), K2(t), and K3(t); through a WF demuxing to recover A(t) and S(t), and then to reconstitute the S(t) by a corresponding de-segmenting process.

We will send K1(t) via the Fa cluster, K2(t) via the Fb cluster, and K3(t) via the Fc cluster to facilitate the feature of "spatial discriminations". Only subscribers in the common coverage area for all three arrays can access K1(t), K2(t), and K3(t). But there are other areas over which the users may access two of the three K-muxed signal substreams sent by the source. They are certainly capable to reconstitute the original data streams AS(t).

When one of the arrays in sky becomes unavailable, subscribers in the common coverage area for all three arrays will still access two of three K-muxed substreams K1(t), K2(t), and K3(t); and thus, can reconstitute the original data stream S(t). The additional UAV cluster provides data transport redundancy.

In another embodiment, the 3 UAV clusters may remain the same. However, the preprocessing for the original data stream, S(t), is altered. S(t) is segmented into three substreams A(t), B(t), and C(t), and then the three substreams wavefront multiplexed (WF muxed) into three WF muxed substreams K1(t), K2(t), and K3(t); where K1(t)=A(t)+B(t)−

C(t), K2(t)=A(t)−B(t)+C(t), and K3(t)=−A(t)+B(t)+C(t). At a destination, a user must receive all three of K1(t), K2(t), and K3(t); through a WF demuxing to recover A(t), B(t), and C(t), and then to reconstitute the S(t) by a corresponding de-segmenting process.

In short, the disclosure is for dynamic communications systems via multiple groups of UAVs; It discloses two unique features of WF muxing, or K-Muxing; (1) to enable a group of multiple UAVs flying in a formation to function as a distributed array in sky via coherent WF muxing techniques, and (2) to achieve data transport with better privacy, and enhanced survivability via incoherent WF muxing.

DETAILED DESCRIPTION

In most of the embodiments presented in this application, wavefront multiplexing (WF Muxing) and wavefront demultiplexing techniques have been implemented for two groups of applications. The first group for WF muxing features information data "mixing" and before data transport for better privacy and with options of generating redundancy in transformed data for enhanced survivability during data transport. "Un-mixing" will be performed on "WF-Muxed" information data by WF-demuxing in destinations.

The second group features equalization of amplitudes and phases among many back-channels of a feeder-link. Each of the element signals is assigned to a unique wavefront for propagating through m backchannels in a feeder-link. The wavefront features a wavefront vector (WFV) with "m" components. The "m" back-channels can support "n" element signals through "n" individual WFVs; where m>n. The "m−n" remaining WFVs will be assigned for known injected signals for dynamic and continuous calibrations. It is for path length equalization, coherent power combining, and enhancing Signal to noise rations in receivers.

FIG. 1 illustrates a UAS communications system with two linear arrays 120A and 120B on sky. The system comprises of three segments, an airborne segment 120, a background segment for control 110, and a foreground user segment 820. Both the background control segment 110 and the foreground user segment 820 are on ground in this example.

A first fan beam 134A formed by a first platform (Fa) with 4 flying UAVs to function as a $1^{st}$ linear array 120A. The $1^{st}$ fan beam 134A is projected over an "elliptical" ground coverage elongated in a first direction. The $1^{st}$ linear array 120A delivers a first aggregated information associated with K1(t)=A(t)+S(t) from a ground control facility, where A(t) and S(t) are segmented substreams by a segment device 712 from an input information stream, AS(t). There are many ways for segmentation. One such technique as shown is to treat an information data stream AS(t) as sequential samples. Segmentation is done via grouping based on the sample sequences. A first substream, A(t) may compose of samples with an odd sequence number; such as the first sample, the third sample, the $5^{th}$ sample, while a second substream, S(t), may compose of samples with an even sequence number; such as the $2^{nd}$ sample, the $4^{th}$ sample, the $6^{th}$ sample and so on.

Similarly, the $2^{nd}$ linear array 120B delivers a second aggregated information associated with K2(t)=A(t)−S(t) from a ground control facility 110, where A(t) and S(t) are derived from an input information stream, AS(t). K1(t) and K2(t) are two outputs of a wavefront multiplexer 116 (WF muxer) on information data, and are complementary to one another. Since the modulators 814 is located downstream from the WF muxing processor 116. The WF muxing 116 only performs processing on information data, not on waveform samples. It is grouped into an incoherent processing for data privacy and data redundancy. Illustrated in FIG. 1 is also a $2^{nd}$ fan beam formed by a $2^{nd}$ platform (Fb) with additional 4 flying UAVs to function as another linear array on sky. The $2^{nd}$ fan beam features a $2^{nd}$ "elliptical" ground coverage elongated in a $2^{nd}$ direction, which is nearly perpendicular to the first direction. The $2^{nd}$ platform on sky delivers a second aggregated information K2(t)=A(t)−S(t) from the same control facility, where the complemental A(t) and S(t) are sufficient to recover the input information data stream, AS(t).

Both K1(t) and K2(t) are two outputs of a preprocessor 102 and are two linear combinations of two data sets of A(t) and S(t), and they can reach a common coverage area (CCA) via both fan beams in a "X". Therefore, A(t) and S(t) can be individually accurately derived numerically only for users in the CCA. Reconstituting the original information data AS(t) for those users become feasible. Users over other portions than the CCA of the "X" coverage will have either K1(t) or K2(t). The available data streams delivered by the UAS comprise of insufficient information for reconstituting A(t) and S(t) individually.

In the ground terminal 110, an information data stream AS(t) is segmented into A(t) and S(t) by a TDM demux 712 device and then Wavefront Multiplexed (WF-Muxed) into two outputs by a WF mux (116) device implemented by a Hadamard transform in a preprocessor 102. In fact, K1(t) =A(t)+S(t) is a first output from the wavefront multiplexing (WF muxing) 116 on two input information data segments, is a linear combination of the two inputs. The aggregated signal K1(t) is modulated by a modulator 814 and becoming waveform data or waveform signal, which is frequency translated, amplified, before sent to a digital beam forming (DBF) network in a remote DBF 112. In the DBF network which remotely perform beam forming functions for a first linear array on sky by the first transponding platform 120A. For the array of 8 elements, the waveform data is replicated 8 times and weighted individually by corresponding 8 components of a "beam weighting vector" (BWV). Weighted signals by the BWV are "element signals" for a corresponding beam projected by the first linear array Fa on sky.

The element signals are then relayed through a relayed waveform format to all radiating elements on the UAVs of the first UAS platform 120A via back-channels of a feeder-link 118A in X, Ku, Ka, a mm band, or even an optical band. The relayed waveforms in a structure form of multiple array elements for weighted information data A(t)+S(t) are aggregated via a coherent WF muxing techniques (not shown), and then uploaded by a multibeam antenna 114 to the group of UAVs in the first UAS platform 120A, Fa, through the backchannels of the feeder-link 118A. The aggregated weighted element signals are represented as [A(t)+S(t)] in the Figure.

The WF muxing and demuxing for a feeder-link on a direct broadcasting satellite has been disclosed extensively in the US Patent with a U.S. Pat. No. 8,098,612 B2 issued on Jan. 17, 2012. We are using similar techniques to assure these back-channels are dynamically compensated and equalized for propagation attenuations and phase delays in the feeder-link 118A.

The weighted waveforms for the array elements on the UAVs are WF demuxed and equalized. They are then transponded to a foreground radiating frequency band in UHF, power amplified and finally radiated toward ground concurrently from multiple array elements of the array

120A. The power radiated are spatially combined to form a projected ground coverage 134A. A 1-D shape of the ground coverage beam 134A is dictated by the BWV introduced in the GBBF facility 110.

In a user terminal over the common coverage area 136 a two-beam antenna array 828 is assumed. Received signals are conditioned including low-noise amplified and properly filtered, and then frequency translated to baseband before digitized and sent to a DBF 822 for beam forming process to form two beam; one pointed to a first UAV platform Fa and the other for a second UAV platform Fb. The beam formed received signals form the Rx DBF beam ports, will be then sent for demodulation by separated demodulators 824 to recover two separated information data substreams K1 (t) and K2(t). They will be sent to a WF demuxer 826 to restructure the A(t) and S(t), the two original information data substreams, and reconstitute the original information data stream AS(t) by a corresponding de-segmentation device 832.

The remote beam forming processing 112 for the transmitter 110 in the forward link direction of a UAV based communications system is further configured to generate multiple outputs; in which a first output comprises waveform signals with multiplexed formats of weighted array element waveform signals to be transmitted by the array elements of the first transponding repeater, Fa 120A, to service the first coverage area 134A, while a second output comprises waveform signals with multiplexed formats of weighted array element waveform signals to be transmitted by the array elements of the second transponding repeater, Fb 120B, to service the second coverage area.

The remote beam forming processing 112 in the forward link data transport is further configured to generate multiple outputs to dynamic control radiating patterns of array antennas on the transponding repeaters Fa 120A, and Fb 120B in the transmitting modes.

The transmitter 110 sending waveform signals with multiplexed formats to the first transponding repeater 120A through back-channels of a feeder-link 118-A; wherein said back-channels are configured to include a dynamic path length equalization capability. The back-channels in the feeder-link 118A is further configured from to function as frequency-division-multiplexed (FDM) channels, or to function as time-division-multiplexed (TDM) channels, or to function as code-division-multiplexed (CDM) channels, or combinations of said multiplexed channels. The dynamic path length equalization on the back-channels in the feeder-link 118-A of further comprises of wavefront multiplexing on signals flowing through the multiplexed back-channels. The wavefront-multiplexing on the feeder-link equalization further comprises of orthogonal matrix; such as Fourier transforms, Hadamard transforms, or others. Equalizations can be implemented either as a pre-distortion processing in the remote processing facility or onboard UAV based platforms; Fa 120A or Fb 120B as post processing. In our examples in this application, the optimizations are implemented in remote beamforming facilities.

In another embodiment a user terminal over the common coverage area 136 features a two-beam antenna array 828. Received signals are conditioned including low-noise amplified and properly filtered, and then frequency translated to baseband before digitized and sent to a DBF 822 for beam forming process to form two beams with orthogonal beam (OB) patterns; (1) a radiation pattern of a first beam with a peak pointed to a first UAV platform Fa 120A and a null to a second UAV platform Fb 120B and (2) the other radiation pattern of a second beam with a null pointed to the first UAV platform Fa 120A and a peak to a second UAV platform Fb 120B. As a result, the interference between the relayed signals by the two UAV platforms will be significantly minimized, say 50 to 60 dB. The beam formed received signals from the Rx DBF beam ports, will be then sent for demodulation by separated demodulators 824 to recover two separated information data substreams K1 (t) and K2(t). They will be sent to a WF demuxer 826 to restructure the A(t) and S(t), the two original information data substreams, and reconstitute the original information data stream AS(t) by a corresponding de-segmentation device 832.

For better survivability of information data transport, a third platform (not shown) with a third set of 4 UAVs might be deployed to deliver a third aggregated information K3(t)= A(t)−2*S(t) from the same ground control facility. A third elliptical coverage elongated in a $3^{rd}$ direction on ground will be projected over the common coverage area (CCA). The $3^{rd}$ direction may be oriented, in between the $1^{st}$ and the $2^{nd}$ directions, say 45° from the $1^{st}$ direction and—say 45°, from the $2^{nd}$ direction. Users in the CCA only need to receive any two of the 3 aggregated information data sets, K1(t), K2(t), and K3(t).

In another embodiment of a low-end user terminal over the common coverage area 136 features an Omni antenna 828. It is a low-cost solution but certainly not a cost-effective architecture. Received signals are conditioned including low-noise amplified and properly filtered, and then frequency translated to baseband before digitized. The DBF 822 for beam forming process shall be modified for different de-multiplexing functions; either TDM, FDM, CDM or combinations of all above for accessing the two air platforms Fa 120A and Fb 120B and receiving K-muxed information data substreams. The control ground segment in a background shall be modified accordingly to accommodate traditional methods of multiple accessing the two airborne platforms 120A and 120B by the low-cost terminal in the foreground.

Figure 1A:
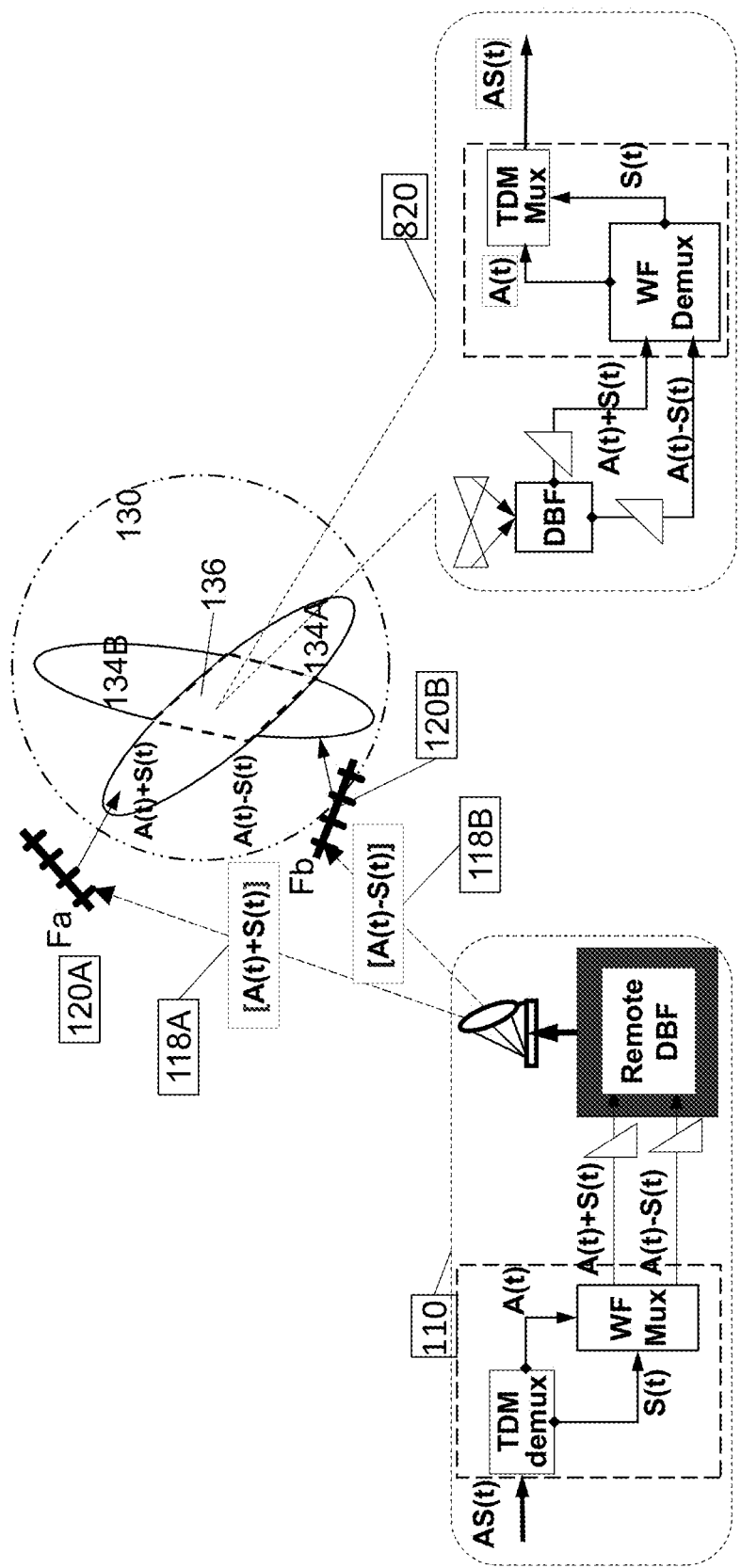
FIG. 1A illustrates a communications system via a UAS by clusters of UAVs forming two linear arrays on sky for forward link data transport as parts of embodiments of this invention.

FIG. 1A depicts near identical operation scenario as that in FIG. 1. The two fan beams 134A and 134B by the two linear arrays 120A and 120B in FIG. 1A are not nearly perpendicular to one-another; the common coverage area 136 becomes a diamond shape.

Figure 1B:
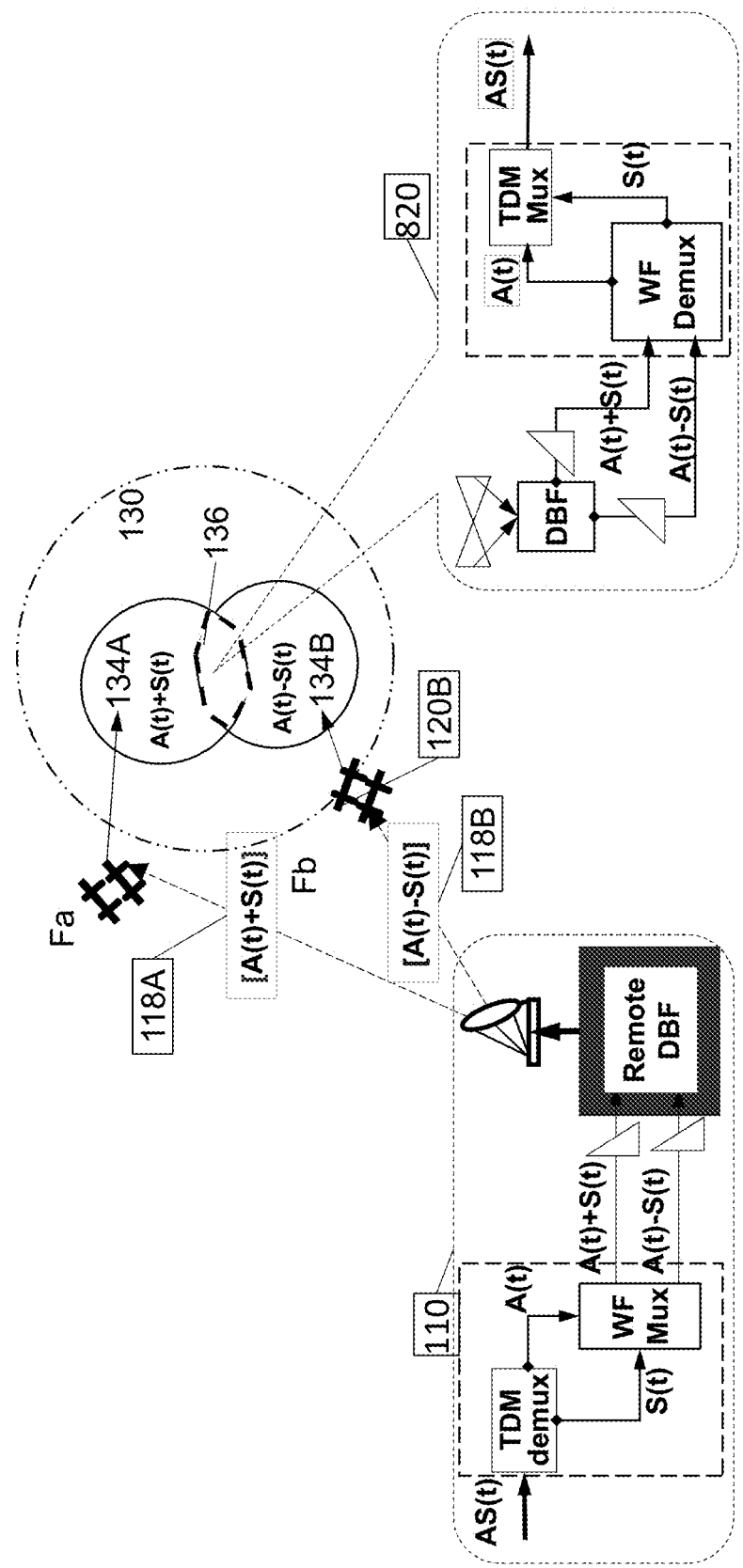
FIG. 1B illustrates a communications system via a UAS by clusters of UAVs forming two arrays on sky for forward link data transport as parts of embodiments of this invention.

FIG. 1B depicts near identical operation scenario as that in FIG. 1. The pointing directions of two beams 134A and 134B by the two arrays 120A and 120B in FIG. 1B are significantly offset from one-another; the common coverage area 136 becomes an "eye" shape. The formations for the dynamic arrays made by a group of 4 flying UAVs are for form a squared lattice for the 4 UAVs.

For the purposes of illustrations, most feeder-links, back-channels or background links between a remote control facility and flying UAVs are implemented in Ku-band, while the foreground links between flying UAVs and users in coverage areas may be in UHF, in examples of this document.

Figure 2:
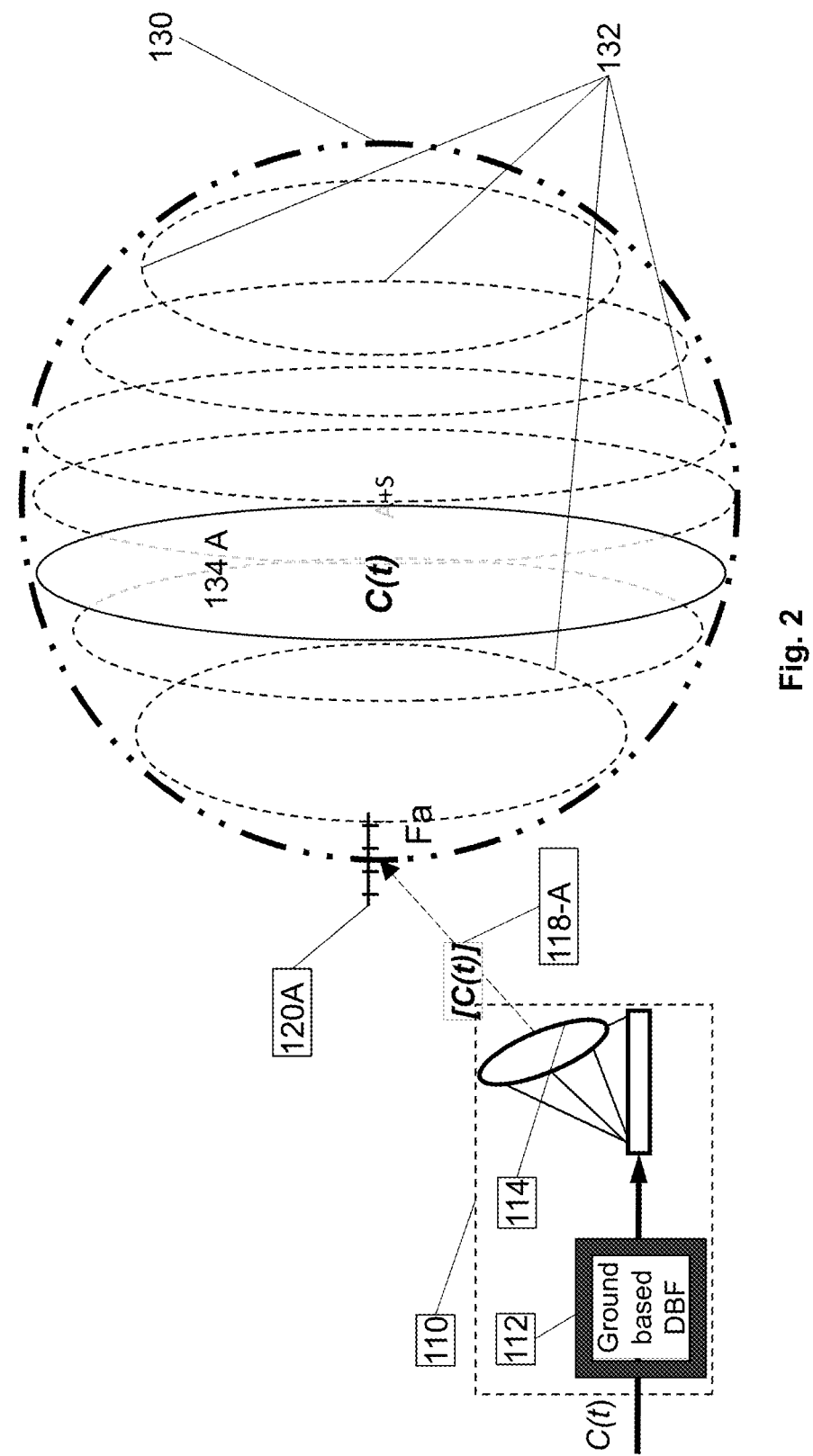
FIG. 2: A shaped fan beam by a cluster of multiple flying UAVs to function as a linear array on sky as parts of embodiments of this invention. The linear array may form moving fan beams with many possible beam positions over a field of view (FOV) through a remote beam forming mechanism on ground

FIG. 2: A shaped fan beam 134A by a cluster of multiple flying UAVs 120A to function as a linear array on sky as parts of embodiments of this invention. The linear array may form fan beams with many possible beam positions 132 over a field of view (FOV) 130 through a remote beam forming mechanism 112 on ground. The ground processing facility 110 may have a remote beam-forming network (RBFN) 112 or processing unit which may featuring a digital beam forming (DBF) technique. The ground facility 110 may also feature a multibeam communications antenna 114 supporting feeder-links including the one 118A linking the ground facility 110 and a UAV-based communication relay platform 120A, Fa.

In the RBFN 112, a waveform data, C(t), is replicated and then weighted individually by corresponding components of a "beam weighting vector" (BWV). Weighted signals by the BWV are "element signals" for a corresponding beam projected by the linear array Fa 120A on sky. The weighted element signals are aggregated before relayed to all radiating elements on the UAVs of the first UAS platform 120A via back-channels of a feeder-link 118A in X, Ku, Ka, a mm band, or even an optical band.

The relayed waveforms in a form of multiple array elements for weighted information data C(t) are aggregated via a coherent WF muxing techniques (not shown), and then uploaded by a multibeam antenna 114 to the group of UAVs in the first UAS platform 120A, Fa, through the backchannels of the feeder-link 118A. The aggregated weighted element signals are represented as [C(t)] in the Figure. The WF muxing and demuxing for a feeder-link on a direct broadcasting satellite has been disclosed extensively in the US Patent with a U.S. Pat. No. 8,098,612 B2 issued on Jan. 17, 2012. We are using similar pre-compensating or pre-distorting techniques to assure these back-channels are dynamically compensated and equalized for propagation attenuations and phase delays in the feeder-link 118A.

The weighted waveforms for the array elements on the UAVs are obtained from on-board WF demuxing [C(t)] which are dynamically equalized in the processing facility 110 on ground using pre-compensating techniques.

They are then transponded to a foreground radiating frequency band which may be in UHF, L/S-band, Ku-band, Ka band, or other RF bands before being power amplified and finally radiated toward ground concurrently from multiple array elements of the array 120A. The powers radiated of C(t) from individual elements are spatially combined to form a projected ground coverage 134A. A 1-D shape of the ground coverage beam 134A of radiated C(t) is dictated by the array geometry, element locations and element spacing, as well as BWV introduced in the GBBF facility 110.

Figure 2A:
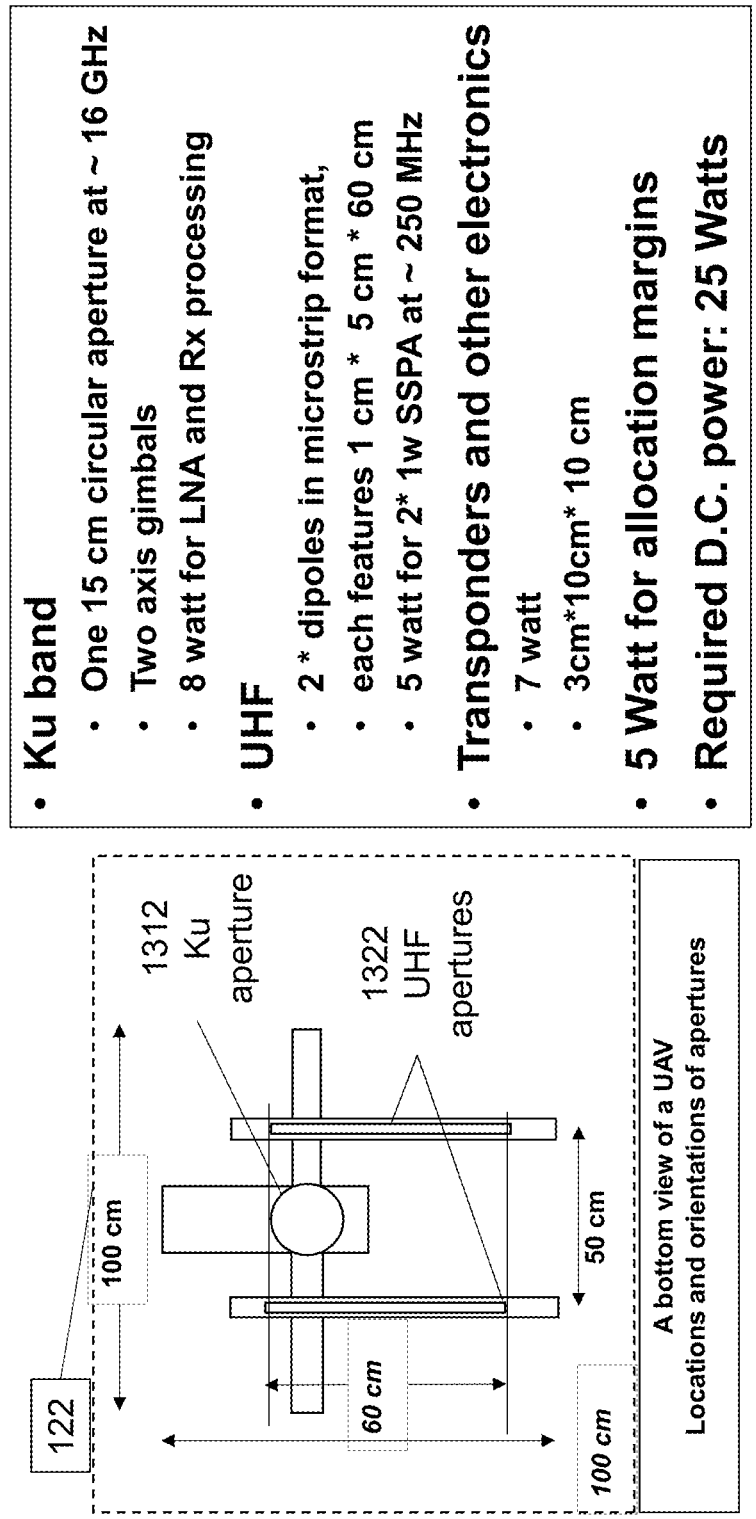
FIG. 2A depicts a customized UAV payload allocation and design concept providing UHF communications to user community in foreground, and Ku-band back-channels for remote beam forming and other communications functions as parts of embodiments of this invention.

FIG. 2A depicts a customized UAV payload allocation 122 and design concept providing UHF communications to user community in foreground, and Ku-band back-channels for remote beam forming and other communications functions as parts of embodiments of this invention. The depicted UAV features 100 cm×100 cm with two tails separated by about 50 cm. The Ku band payload comprises of one 15 cm circular aperture 1312 with two axis gimbals operating at ~16 GHz, and allocated power of 8 watts for all transmitting and receiving function.

The UHF payload comprises of two dipoles 1322 in microstrip format, each with a 5 cm*60 cm aperture with two 1 w SSPA at ~250 MHz. Its transmitting and receiving functions will consume 5 watts on average. Transponders and other electronics on the UAV 122 will consume 7 watts and be packed in a 3 cm*10 cm*10 cm volume. The total allocated power is at 25 Watts including a 5 Watts allocation margin.

Figure 2B:
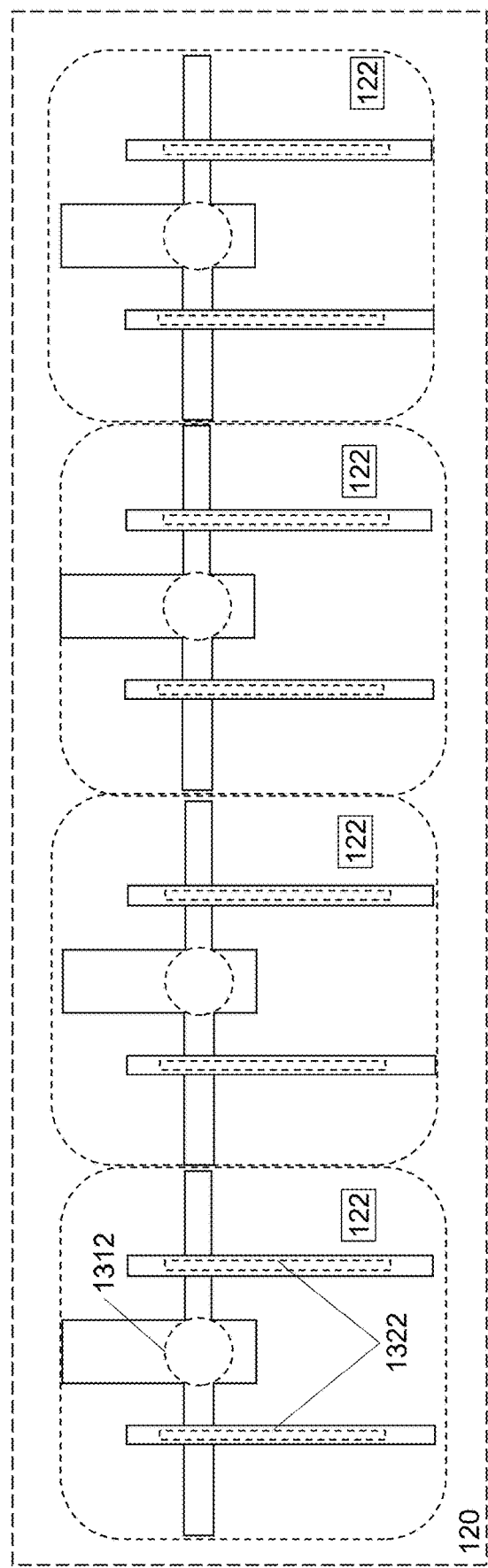
FIG. 2B depicts a geometry of an 8-element linear array in UHF on sky using 4 flying UAVs as parts of embodiments of this invention. The designed beam forming for the array will take place remotely on a ground facility which is linked to the array via Ku-band apertures.

FIG. 2B depicts a geometry of an UHF linear array 120A with 8 array elements 1322 on sky using 4 flying UAVs 122 as parts of embodiments of this invention. The designed beam forming for the array will take place remotely on a ground facility which is linked to the array via Ku-band apertures 1312. As the 4 UAVs are flying in a precision format with wingtip-to-wingtip soft contact features, a distributed dynamic array with 8 elements is formed. The dipole elements 1322 are aligned in the along-track direction of the 4 flying UAVs, while the end-fired directions of the array 120A is in the transverse directions of the UAVs flying paths.

Figure 3:
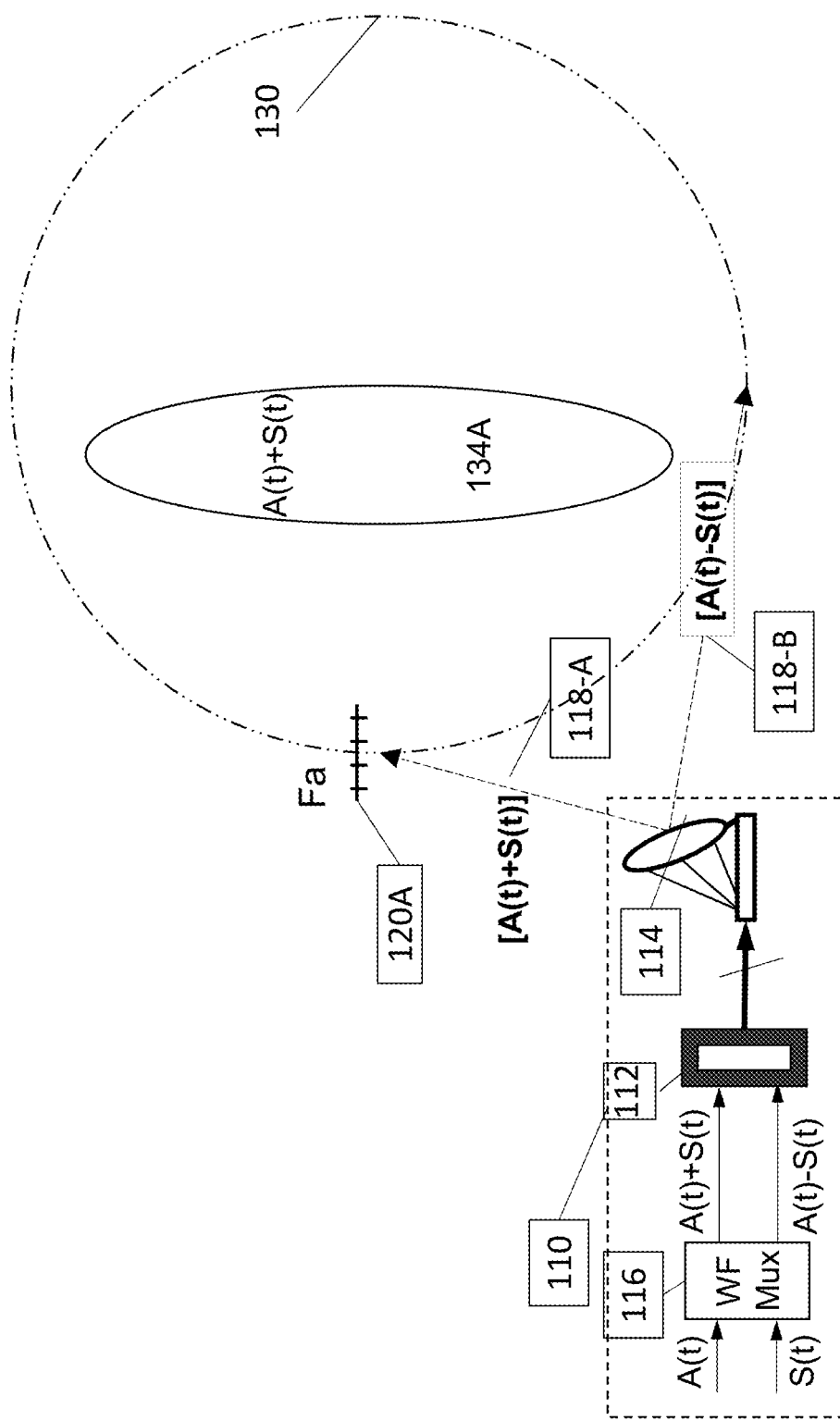
FIG. 3 depicts a first shaped fan beam in the FOV by a first cluster of multiple flying UAVs to function as a linear array on sky for forward link data transport as parts of embodiments of this invention. It shows transmitted signals to users are preprocessed before uploaded to the linear array on sky; so that the first part of the processed signals are projected in the first fan-beam coverage.

FIG. 3 depicts a first shaped fan beam 134A in the FOV 130 by a first cluster of multiple flying UAVs to function as a linear array 120A on sky as parts of embodiments of this invention. It is a data flowing diagram and shows transmitted information data from a source to users. We shall use "120A" to indicate both the first linear array in sky and the first airborne platform comprising multiple flying UAVs.

Two information data streams, A(t) and S(t), are preprocessed by a 2-to-2 wavefront multiplexing (WF muxing) processor 116 before uploaded by a multibeam antenna 114 at a ground processing facility 110 to the linear array 120A on sky. The array on sky 120A and the processing facility is linked via a feeder-link 118-A. The two inputs to the WF muxing 116 are A(t) and S(t) and two output information data streams are K1(t)=A(t)+S(t), and K2(t)=A(t)−S(t). A first of the two signal streams, K1(t), will eventually be projected into the first fan-beam coverage 134A.

It is noticed that A(t) and S(t) can be derived mathematically only if K1(t) and K2(t) are known. On the other hand, A(t) and S(t) cannot be derived mathematically if only one of K1(t) and K2(t) is known without additional information on A(t) and S(t). Therefore, we claim that K1(t) and K2(t) are a complimentary pair to one another as far as solving both A(t) and S(t) is concerned. But they are not the only pair in solving both A(t) and S(t). They are one of many mathematical pairs in solving both A(t) and S(t).

It is also noticed that both K1(t) and K2(t) are information data streams, which must be transformed into waveform signal streams or signals before a remote beam forming processor 112 and then uploaded to the first linear array on the first UAV based platform 120A. Information data may be transformed into waveform signals via a modulator. Similarly, the waveform signals may be converted back to the information data via a corresponding de-modulator. Modulators/de-modulators are not depicted in FIG. 3.

Supposed we have 8 array elements on the first linear array 120A (Fa) on the first airborne platform. The N elements are indexed as a, b, c, d, e, f, g, and h such that the $1^{st}$ element as element "a" and the $8^{th}$ element as element "g". For delivering a waveform signal stream or simply a signal, x(t), from the array to a designated and customized shaped coverage, there are 8 weightings in a beam weighting vector (BWV).

They are denoted as follows:

$$BWVx=(Wxa, Wxb, Wxc, Wxd, Wxe, Wxf, Wxg, Wxh) \quad (1)$$

The to-be-transmitted weighed signals for the 8 elements calculated by the RBFN 112 are, respectively, $$Ex(t)=(Eax(t), Ebx(t), Ecx(t), Edx(t), Eex(t), Efx(t), Egx(t), Ehx(t)) \quad (2)$$

where: $Eax(t)=Wxa*x(t)$ (2a)

$Ebx(t)=Wxb*x(t)$ (2b)

$Ecx(t)=Wxc*x(t)$ (2c)

$Edx(t)=Wxd*x(t)$ (2d)

$Eex(t)=Wxe*x(t)$ (2e)

$Efx(t)=Wxf*x(t)$ (2f)

$Egx(t)=Wxg*x(t)$ (2g)

$Ehx(t)=Wxh*x(t)$ (2h)

Let us further assume that the eight weighted element signals by the BWVx are frequency multiplexed by a conventional FDM technique forming a single bundle of element signals for the feeder link 118A. Signals to be transmitted by the $N^{th}$ element by the array 120A will be frequency shifted by a (N−1)δω before summing. Thus, the associated uploaded signal format for x(t);

$$[x(t)] = Eax(t) + Ebx(t)*e^{j\delta\omega t} + Ecx(t)*e^{j2\delta\omega t} + Edx(t)*e^{j3\delta\omega t} + Ebx(t)*e^{j4\delta\omega t} + Ebx(t)*e^{j5\delta\omega t} + Ebx(t)*e^{j6\delta\omega t} + Edx(t)*e^{j7\delta\omega t} \quad (3)$$

With each of the element signals assigned to a subchannel in a feeder-link, the weighted element signals may also be multiplexed by conventional techniques other than FDM such as TDM, CDM or combinations of all above. These subchannels in a feeder-link are also referred to as backchannels. They all require real-time dynamic compensations and equalizations for propagation phase and amplitude differentials among subchannels. Careful implementations of equalization among backchannels in feeder-links are key to successful remote beamforming techniques.

In FIG. 1 of the U.S. Pat. No. 8,098,612 B2, an overlay technique on an existed conventional FDM multiplexed backchannels for continuous dynamic equalization in a remote beam forming architecture for Direct Satellite Broadcasting was presented. The overlay techniques feature wavefront multiplexing and wavefront demultiplexing either with post compensation on board relay platforms or with pre-compensation on ground. The same overlaid techniques can be applied to other multiple access (FDMA, TDMA or CDMA) or multiplexing structure (TDM and CDM) enhancing dynamic equalizations among all back-channels, and enabling coherency among same signals propagating through multiple subchannels for SNR improvement.

Figure 3A:
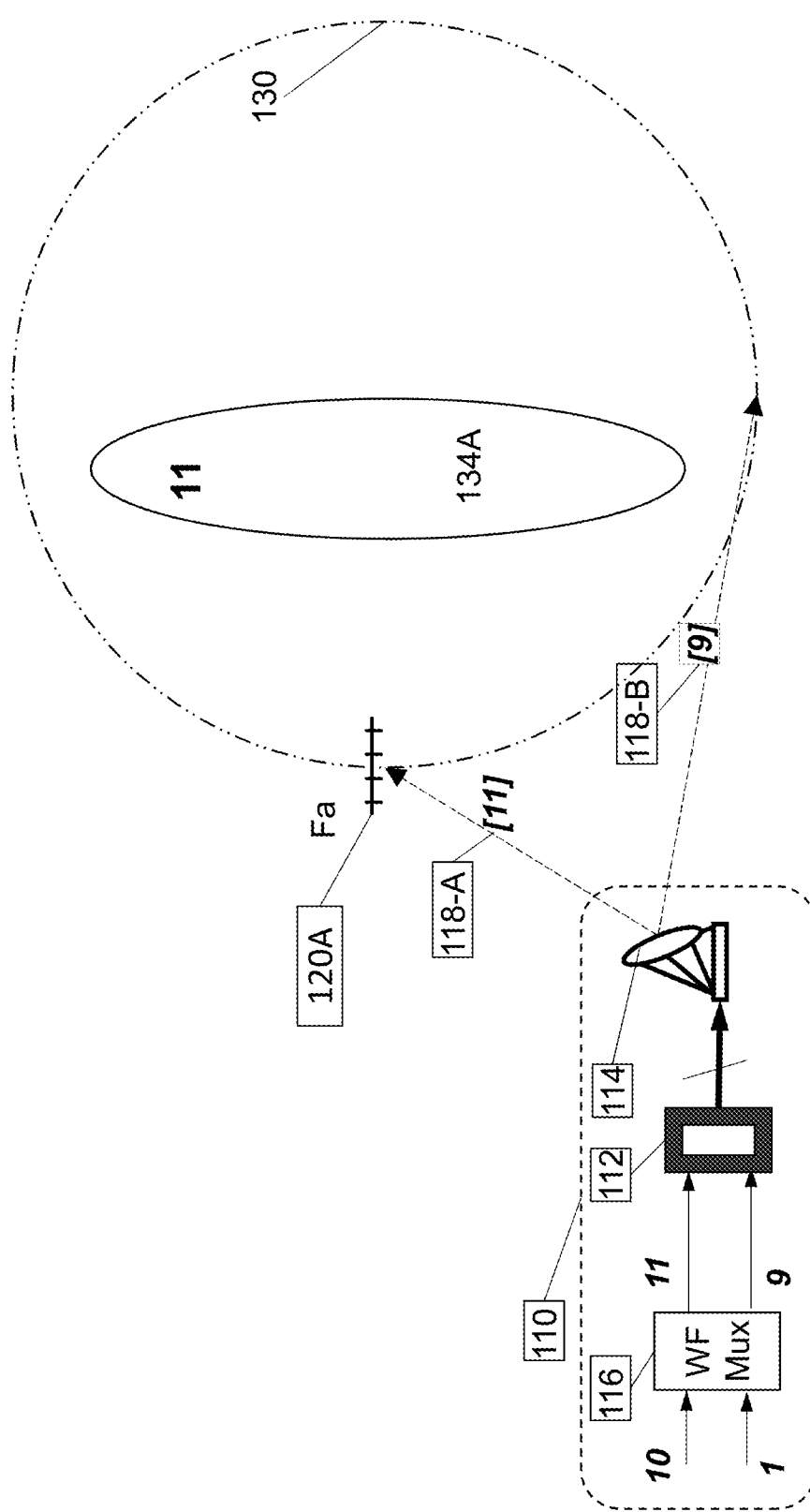
FIG. 3A depicts a numerical example as parts of embodiments of this invention for transmitting data sets in FIG. 3

FIG. 3A depicts a numerical example as parts of embodiments of this invention for transmitting data sets in FIG. 3. For simplicity, A(t) features a single numerical sample of 10 and S(t) is also another single numerical sample of 1. The 2-to-2 WF muxing 116 shall generate two outputs; K1(t)=11 and K2(t)=9. It is intended to send K1(t)=11 to the coverage area 134A via the liner array 120A on sky.

Figure 4:
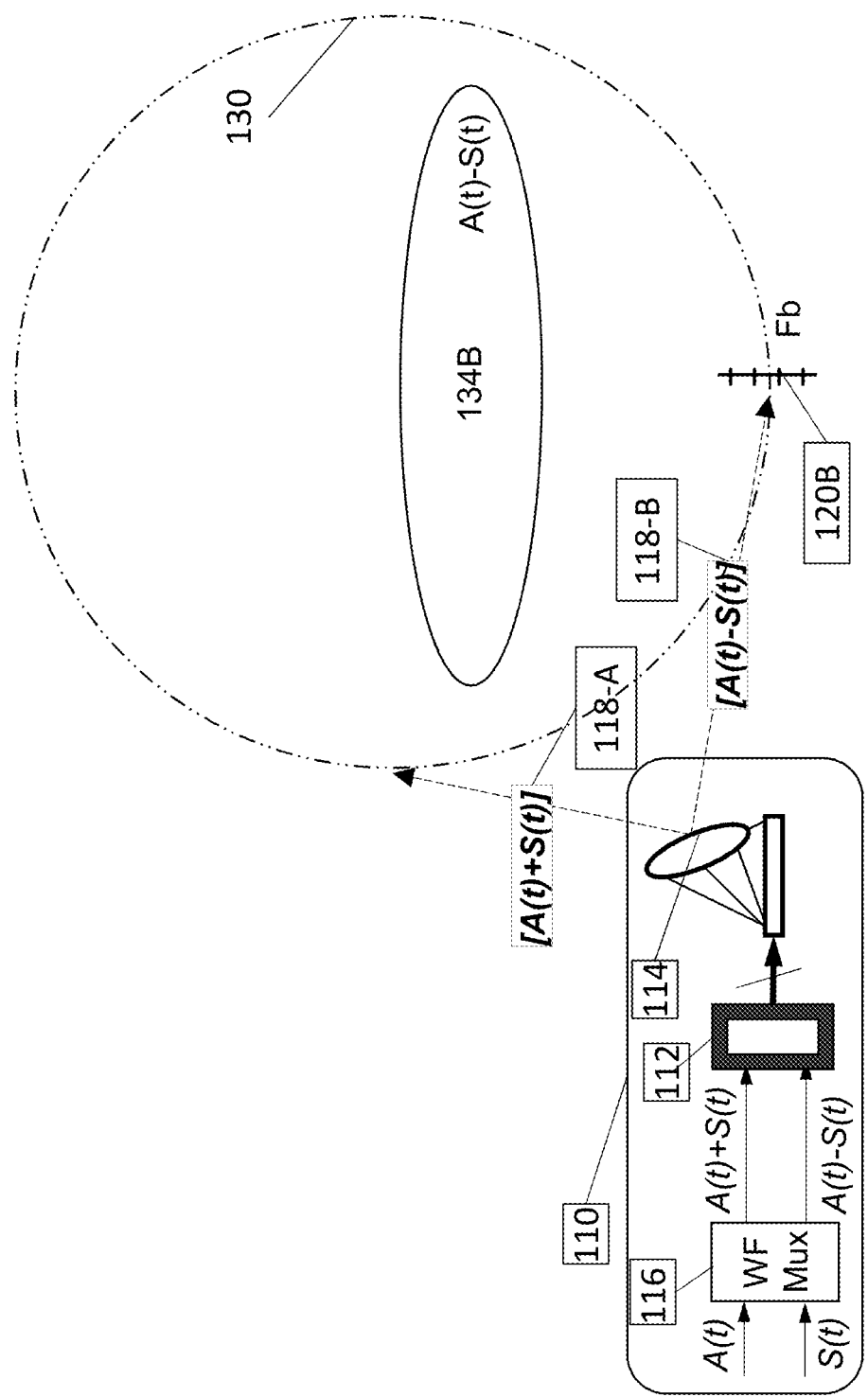
FIG. 4 depicts a second shaped fan beam in the FOV by a second cluster of multiple flying UAVs to function as another linear array on sky for forward link data transport as parts of embodiments of this invention. It shows preprocessed transmitted signals to users before uploaded to the second linear array on sky; so that a complementary to the first part of the processed transmitted signals are projected in the second fan-beam coverage.

FIG. 4 depicts a second shaped fan beam 134B in the FOV 130 by a second cluster of multiple flying UAVs to function as another linear array 120B on sky as parts of embodiments of this invention. It shows how another preprocessed transmitted information data stream K2(t) is delivered to users. The second preprocessed information data stream K2(t)=A(t)−S(t) by the same WF muxer 116 is uploaded to the second linear array on sky 120B via a second feeder-link 118B; so that K2(t), or a complementary to the first of the processed transmitted information data stream K1(t) are projected in the second fan-beam coverage 134B. The second feeder-link 118B connects the multibeam antenna 114 in the processing facility 110 to the UAV based airborne platform 120B, Fb.

Figure 4A:
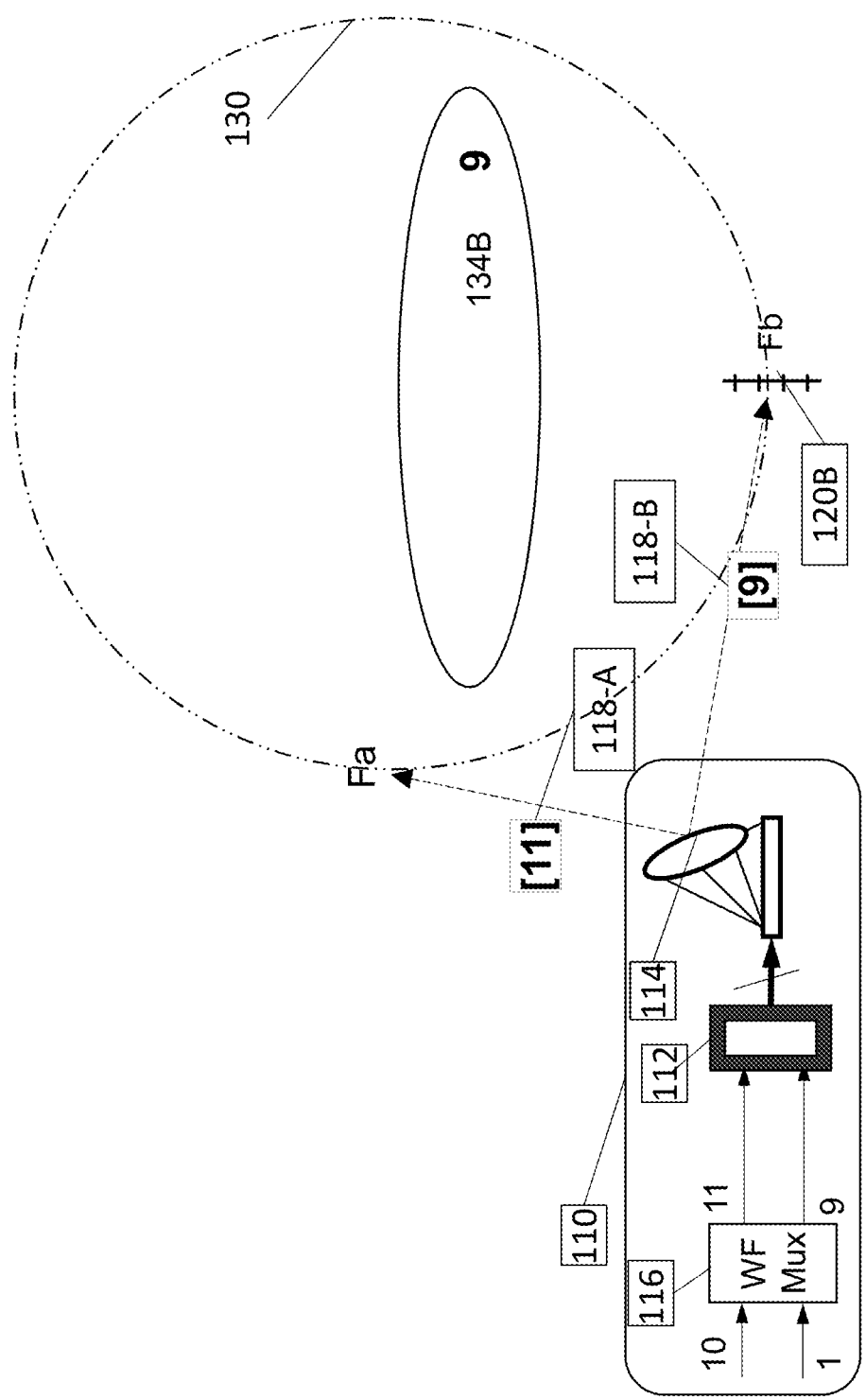
FIG. 4A depicts a numerical example as parts of embodiments of this invention for transmitting data sets in FIG. 4.

FIG. 4A depicts a numerical example as parts of embodiments of this invention for transmitting data sets in FIG. 4. The input numerical samples are the same as those in FIG. 3A. The 2-to-2 WF muxing 116 shall generate two outputs; K1(t)=11 and K2(t)=9. It is intended to send K2 (t)=9 to the coverage area 134B via the liner array 120B on sky.

Figure 5:
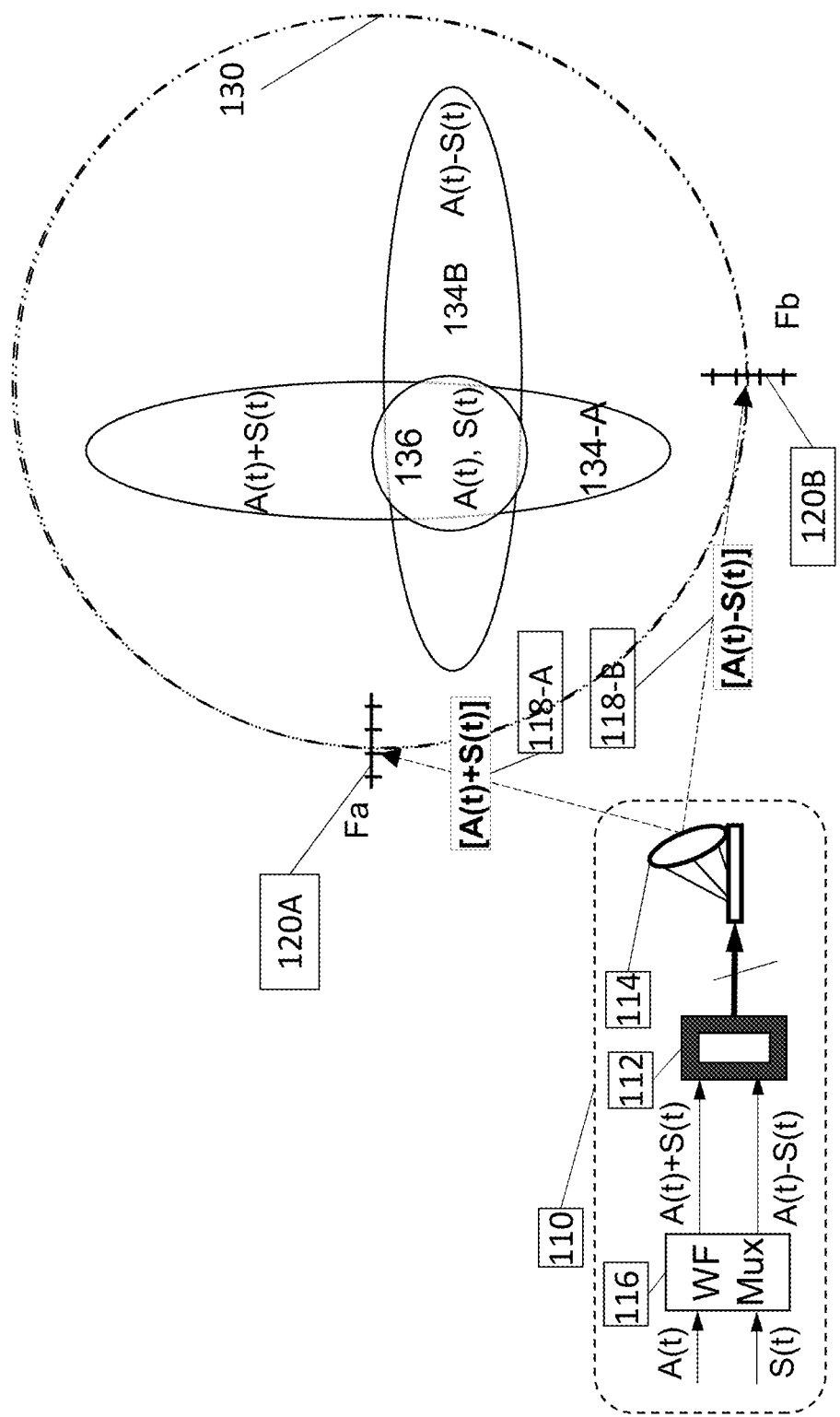
FIG. 5 depicts a common coverage from the two fan-beams for forward link data transport as parts of embodiments of this invention; sending different complementary signals individually. Only users over the common coverage area can receive all complementary pre-processed data sets, and thus become capable to reconstitute the original data set

FIG. 5 depicts a common coverage 136 from the two fan-beams 134A and 134B as parts of embodiments of this invention. It is a combination of FIG. 3 and FIG. 4, sending K1(t) to a coverage area of 134A via Fa UAS platform 120A from a ground processing facility 110 depicted in FIG. 3, and projecting K2(t) to a coverage area of 134B via Fb UAS platform 120B from the same ground processing facility 110 depicted in FIG. 4.

These fan beams 134A and 134B; cover various service areas while sending individually different complementary signals K1(t) and K2(t); where K1(t)=A(t)+S(t) and K2(t)=A(t)−S(t). Only users over the common coverage area 136 can receive all complementary pre-processed data sets K1(t) and K2(t), and thus become capable to reconstitute the original data set; A(t) and S(t)

Figure 5A:
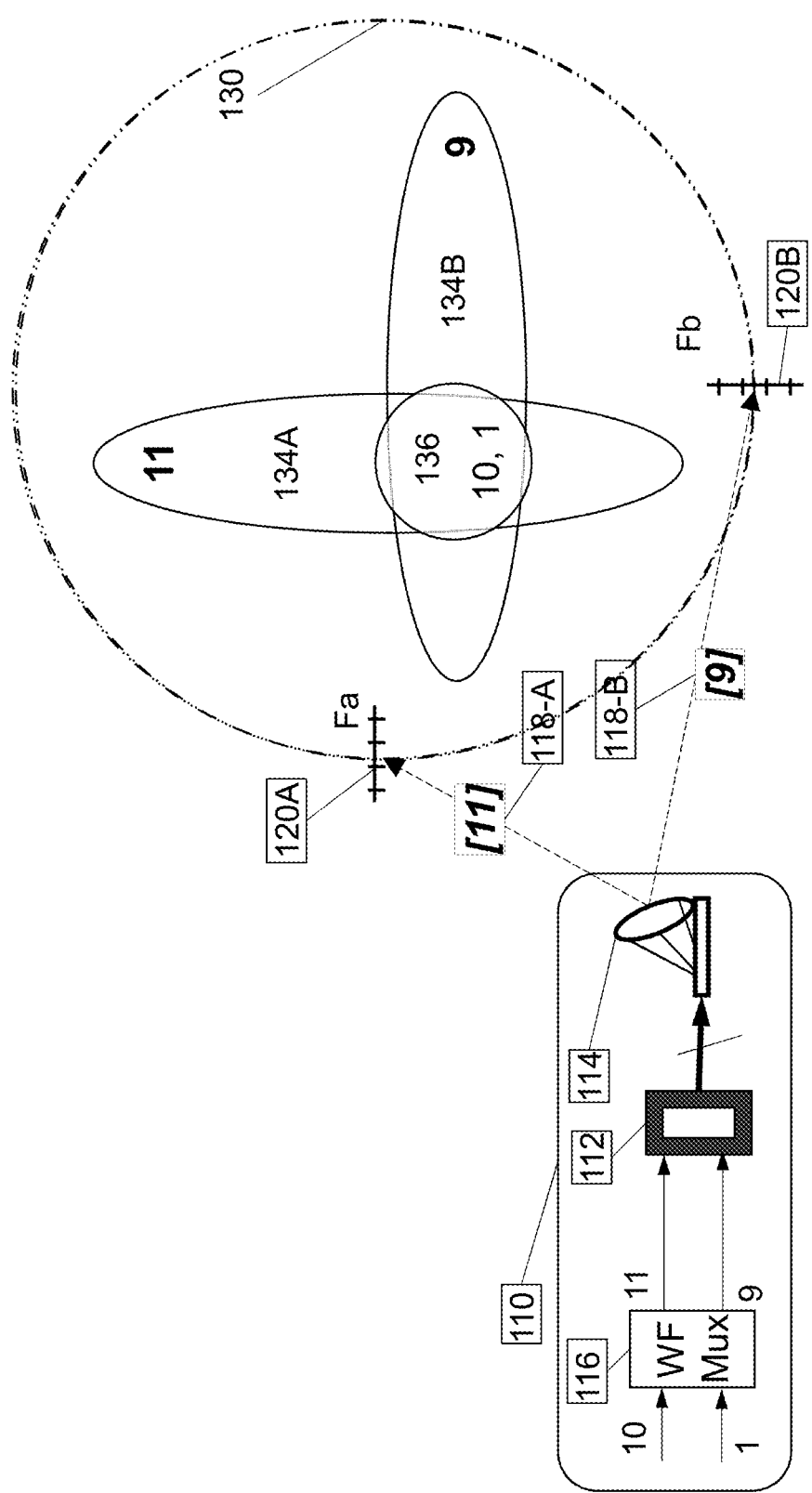
FIG. 5A depicts a numerical example for transmitting data sets in FIG. 5 as parts of embodiments of this invention.

FIG. 5A depicts a numerical example for transmitting data sets in FIG. 5 as parts of embodiments of this invention. The numerical samples are identical to those in FIG. 3A and those in FIG. 4A. As a result, the sample numerical value of K1(t)=11 is projected over a first fan-beam coverage 134A, while that of K2(t)=9 is sent to a $2^{nd}$ fan-beam coverage 134B. Only users over the common coverage area 136 can receive all complementary pre-processed data sets K1(t)=11 and K2(t)=9, and thus become capable to reconstitute the original data set; A(t)=10 and S(t)=1.

Figure 6A:
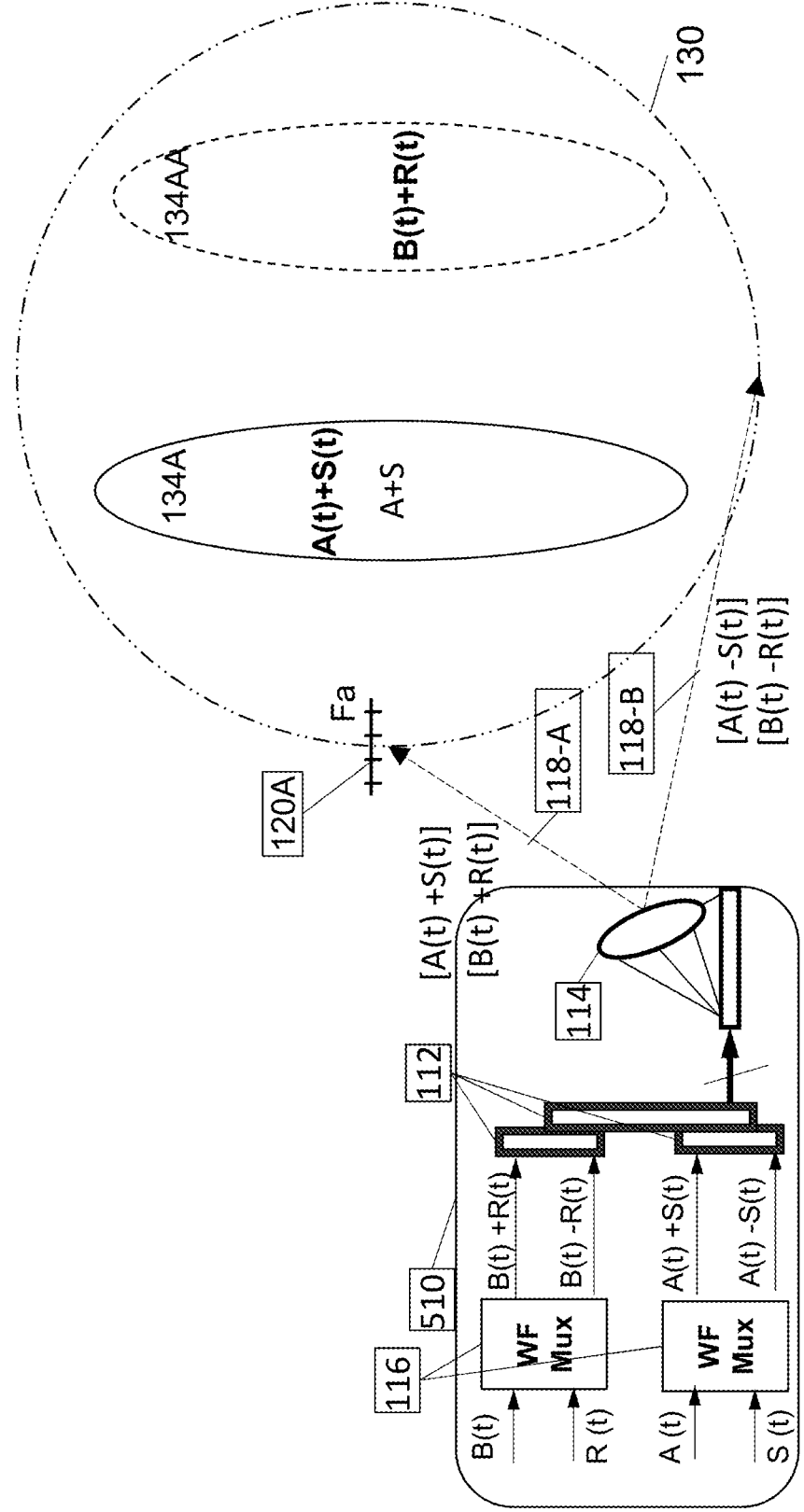
FIG. 6A depicts a first group of concurrent shaped fan beams in the FOV by a first cluster of multiple flying UAVs to function as a linear array on sky for forward link data transport as parts of embodiments of this invention. It shows two data sets of transmitted signals to two groups of users are preprocessed before uploaded to the linear array on sky; so that the a set of first part of the processed signals are projected in the first set of two concurrent fan-beams.

FIG. 6A depicts a first group of concurrent shaped fan beams 134A and 134AA in the FOV 130 by a first cluster of multiple flying UAVs to function as a first linear array 120A on sky as parts of embodiments of this invention. It shows two sets of information data {B(t), R(t)} and {A(t), S(t)} of transmitted signals to two different groups of users are preprocessed by two separated 2-to-2 WF muxers 116. Two outputs from a first WF muxer 116 (the top one) with the input information data set of {B(t), R(t)} are two processed information data streams; K3(t)=B(t)+R(t) and K4(t)=B(t)−R(t). Similarly, two outputs from a second WF muxer 116 (the bottom one) with the input information data set of {A(t), S(t)} are another two processed information data streams; K1(t)=A(t)+S(t) and K2(t)=A(t)−S(t). K1(t) and K3(t) are further processed through modulations and remote beam forming before uploaded to the first linear array 120A on sky via a first feeder-link 118A.

The uploaded signal format in the first feeder-link 118A for the associated K1(t) data stream by the remote beam forming processors 112 for the first linear array 120A to illuminate the first fan beam coverage 134A is represented as [A(t)+S(t)]; while that for the associated K3(t) data stream by the remote beam forming processors 112 for the same first linear array 120A to illuminate concurrently the second fan beam coverage 134AA is denoted by [B(t)+R(t)]. As a result, the two processed signals associated with K1(t) and K3(t) are projected, respectively, to two separated coverage areas 134A and 134AA by the two concurrent fan-beams 134A and 134AA.

We shall use x(t) and y(t) in the discussion of signal formats in a feeder-link to an airborne platform; such that the formulations are applicable to all feeder-links connected to the different airborne platforms from a ground hub.

Supposed we have 8 array elements on the first linear array 120A (Fa) on the first airborne platform again. The N elements are indexed as a, b, c, d, e, f, g, and h such that the $1^{st}$ element as element "a," and the $8^{th}$ element as element "g" as before. The first linear array 120A will form two beams 134A and 134AA. For delivering a first waveform signal stream or simply a first signal, x(t), from the array 120A to a first designated and customized shaped coverage 134A and concurrently delivering a second waveform signal stream or simply a second signal, y(t), from the same array 120A to a second designated and customized shaped coverage, the two beams 134A and 134AA features two BWV sets, each with 8 weightings or weighting components. For the first platform 120A, x(t) is K1(t)=A(t)+S(t), and y(t) is K3(t)=B(t)+R(t).

The BWVs are denoted as follows;

$$BWVx = (Wxa, Wxb, Wxc, Wxd, Wxe, Wxf, Wxg, Wxh) \quad (4a)$$

$$BWVy = (Wya, Wyb, Wyc, Wyd, Wye, Wyf, Wyg, Wyh) \quad (4b)$$

The to-be-transmitted weighed signals for the 8 elements calculated by the remote beam forming network (RBFN) 112 are, respectively, $$\underline{Exy(t)} = (Eaxy(t), Ebxy(t), Ecxy(t), Edxy(t),$$

$$Eexy(t), Efxy(t), Egxy(t), Ehxy(t)) \quad (5)$$

where: $Eaxy(t) = Wxa^*x(t) + Wya^*y(t)$ (5a)

$Ebxy(t) = Wxb^*x(t) + Wyb^*y(t)$ (5b)

$Ecxy(t) = Wxc^*x(t) + Wyc^*y(t)$ (5c)

$Edxy(t) = Wxd^*x(t) + Wyd^*y(t)$ (5d)

$Eexy(t) = Wxe^*x(t) + Wye^*y(t)$ (5e)

$Efxy(t) = Wxf^*x(t) + Wyf^*y(t)$ (5f)

$Egxy(t) = Wxg^*x(t) + Wyg^*y(t)$ (5g)

$Ehxy(t) = Wxh^*x(t) + Wyh^*y(t)$ (5h)

Let us further assume that the eight weighted sums of element signals by the two individual BWVx are frequency multiplexed by a conventional FDM technique forming a single bundle of element signals for the feeder link 118A. Signals to be transmitted by the $N^{th}$ element by the array 120A will be frequency shifted by a (N−1)δω before summing. Thus, the associated uploaded signal format for x(t) and y(t):

$$[x(t)] \& [y(t)] = \quad (6)$$
$$Eaxy(t) + Ebxy(t)*e^{j\delta\omega t} + Ecxy(t)*e^{j2\delta\omega t} + Edxy(t)*e^{j3\delta\omega t} +$$
$$Ebxy(t)*e^{j4\delta\omega t} + Ebxy(t)*e^{j5\delta\omega t} + Ebxy(t)*e^{j6\delta\omega t} + Edxy(t)*e^{j7\delta\omega t}$$

The conventional FDM multiplexing may be replaced by TDM or CDM multiplexing techniques.

On the first platform 120A, received backchannel signals will be amplified by low-noise amplifiers and then properly filtered as parts of a received signal conditioning process before FDM demuxed and frequency converted to a common UHF carrier to recover individual element signals, which are shown in a vector format of $\underline{Exy(t)}$ of Equation (5). The components of the vector will be transmitted by the 8 array elements individually and simultaneously.

The two depicted coverages 134A and 134AA are completely separated spatially. The signals associated with K1(t) and K3(t) for the two beams are at the same carrier frequency. This operation concept features a 2× frequency re-use due to good isolations among the two fan beams 134A and 134AA. Users in coverage 134A shall receive K1(t) while those in coverage 134AA shall receive K3(t) only They may also be contiguous coverages with some small overlap regions in other embodiments. Users in coverage 134A shall receive K1(t) while those in coverage 134AA shall receive K3(t) only. But those in the overlapped coverage can received both K1(t) and K3(t).

Figure 6B:
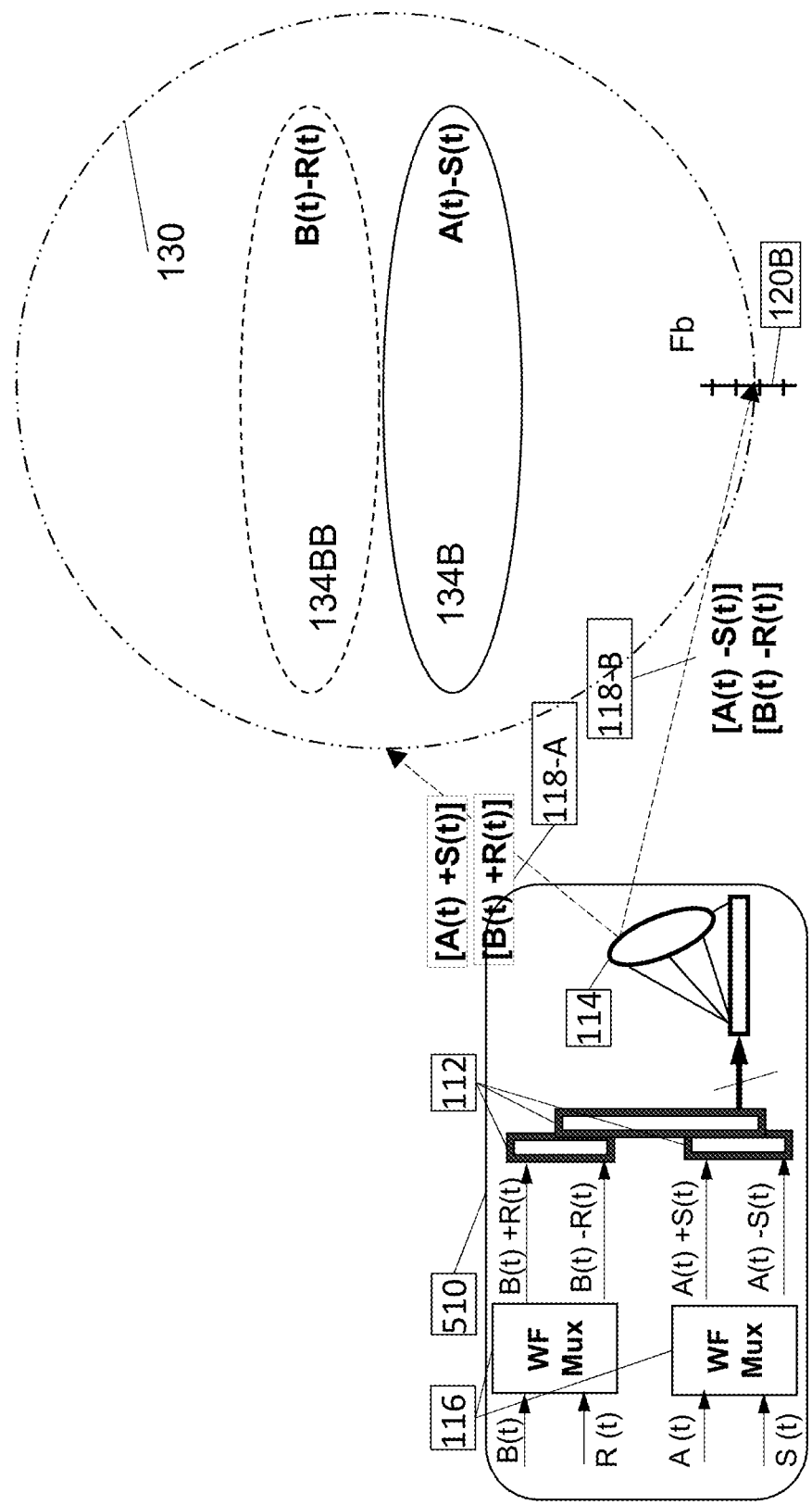
FIG. 6B depicts a second group of concurrent shaped fan beams in the FOV by a second cluster of multiple flying UAVs to function as a linear array on sky for forward link data transport as parts of embodiments of this invention. It shows two data sets of transmitted signals to two groups of users are preprocessed before uploaded to the linear array on sky; so that a set of complementary to the first part of the processed signals are projected in the second set of two concurrent fan-beams.

FIG. 6B depicts a second group of concurrent shaped fan beams 134B and 134BB in the FOV 130 by a second cluster of multiple flying UAVs to function as a second linear array 120B on sky as parts of embodiments of this invention. It shows two sets of information data {B(t), R(t)} and {A(t), S(t)} of transmitted signals to two different groups of users are preprocessed by the same two separated 2-to-2 WF muxers 116 as those in FIG. 6A. Two outputs from a first WF muxer 116 (the top one) with the input information data set of {B(t), R(t)} are two processed information data streams; K3(t)=B(t)+R(t) and K4(t)=B(t)−R(t). Similarly, two outputs from a second WF muxer 116 (the bottom one) with the input information data set of {A(t), S(t)} are another two processed information data streams; K1(t)=A(t)+S(t) and K2(t)=A(t)−S(t). K2(t) and K4(t) are further processed through modulations and remote beam forming before uploaded to the second linear array 120B on sky via a second feeder-link 118B.

The uploaded signal format in the second feeder-link 118B for the associated K2(t) data stream by the remote beam forming processors 112 for the second linear array 120B to illuminate the third fan beam coverage 134B is represented as [A(t)−S(t)]; while that for the associated K4(t) data stream by the remote beam forming processors 112 for the same second linear array 120B to illuminate concurrently the fourth fan beam coverage 134BB is denoted by [B(t)−R(t)]. As a result, the two processed signals associated with K2(t) and K4(t) are projected, respectively, to two separated coverage areas 134B and 134BB by the two concurrent fan-beams 134B and 134BB.

The 8 array elements on the second linear array 120B (Fb) on the second airborne platform again are indexed as a, b, c, d, e, f, g, and h such that the $1^{st}$ element as element "a," and the $8^{th}$ element as element "g" as before. We also use the same formulation of Equations (4), (5) and (6) for the second linear array in sky 120B. For delivering a third waveform signal stream or simply a $3^{rd}$ signal, x(t) representing the waveform of the information data stream K2(t)=A(t)−S(t), from the array 120B to a third designated and customized shaped coverage 134B and concurrently delivering a fourth waveform signal stream or simply a $4^{th}$ signal, y(t), representing the waveform of the information data stream K4(t) =B(t)−R(t), from the same second array 120B to a $4^{th}$ designated and customized shaped coverage 134BB, the two beams 134B and 134BB are associated with two BWV sets, each with 8 weightings or weighting components as shown in Equations (4a) and (4b).

The to-be-transmitted weighed signals for the 8 elements calculated by the remote beam forming network (RBFN) 112 are, respectively, $$Exy(t) = (Eaxy(t), Ebxy(t), Ecxy(t), Edxy(t),$$

$$Eexy(t), Efxy(t), Egxy(t), Ehxy(t)) \quad (5)$$

where, $Eaxy(t) = Wxa^*x(t) + Wya^*y(t)$ (5a)

$Ebxy(t) = Wxb^*x(t) + Wyb^*y(t)$ (5b)

$Ecxy(t) = Wxc^*x(t) + Wyc^*y(t)$ (5c)

$Edxy(t) = Wxd^*x(t) + Wyd^*y(t)$ (5d)

$Eexy(t) = Wxe^*x(t) + Wye^*y(t)$ (5e)

$Efxy(t) = Wxf^*x(t) + Wyf^*y(t)$ (5f)

$$Egxy(t)=Wxg^*x(t)+Wyg^*y(t) \quad (5g)$$

$$Ehxy(t)=Wxh^*x(t)+Wyh^*y(t) \quad (5h)$$

The eight weighted sums of element signals by the two individual BWVx are frequency multiplexed by a conventional FDM technique forming a single bundle of element signals for the feeder link 118A. Signals to be transmitted by the $N^{th}$ element by the array 120A will be frequency shifted by a $(N-1)$ $\delta\omega$ before summing. Thus, the associated uploaded signal format for x(t) and y(t);

$$[x(t)] \& [y(t)] = \quad (6)$$
$$Eaxy(t) + Ebxy(t)*e^{j\delta\omega t} + Ecxy(t)*e^{j2\delta\omega t} + Edxy(t)*e^{j3\delta\omega t} +$$
$$Ebxy(t)*e^{j4\delta\omega t} + Ebxy(t)*e^{j5\delta\omega t} + Ebxy(t)*e^{j6\delta\omega t} + Edxy(t)*e^{j7\delta\omega t}$$

On the second platform 120B, received backchannel signals are amplified by low-noise amplifiers and then properly filtered as parts of a received signal conditioning process before FDM demuxed and frequency converted to a common UHF carrier to recover individual element signals, which are shown in a vector format of Exy(t) of Equation (5). The components of the vector will be transmitted by the 8 array elements individually and simultaneously.

The two depicted coverages 134B and 134BB are completely separated spatially. The signals associated with K2(t) and K4(t) for the two beams are radiated at the same carrier frequency. This operation concept features a 2× frequency re-use due to good isolations among the two fan beams 134B and 134BB. Users in coverage 134B shall receive information data K2(t) while those in coverage 134BB shall receive information data K3(t) only They may also be contiguous coverages with some small overlap regions in other embodiments. Users in coverage 134A shall receive information data K1(t) while those in coverage 134AA shall receive information data K3(t) only. But those in the overlapped coverage receive combined signals associated with information data K1(t) and K3(t); which are not separable when the carriers are in the same frequency or too close to separate. Thus, overlapped region may become an exclusion region due to self-jamming.

Figure 6C:
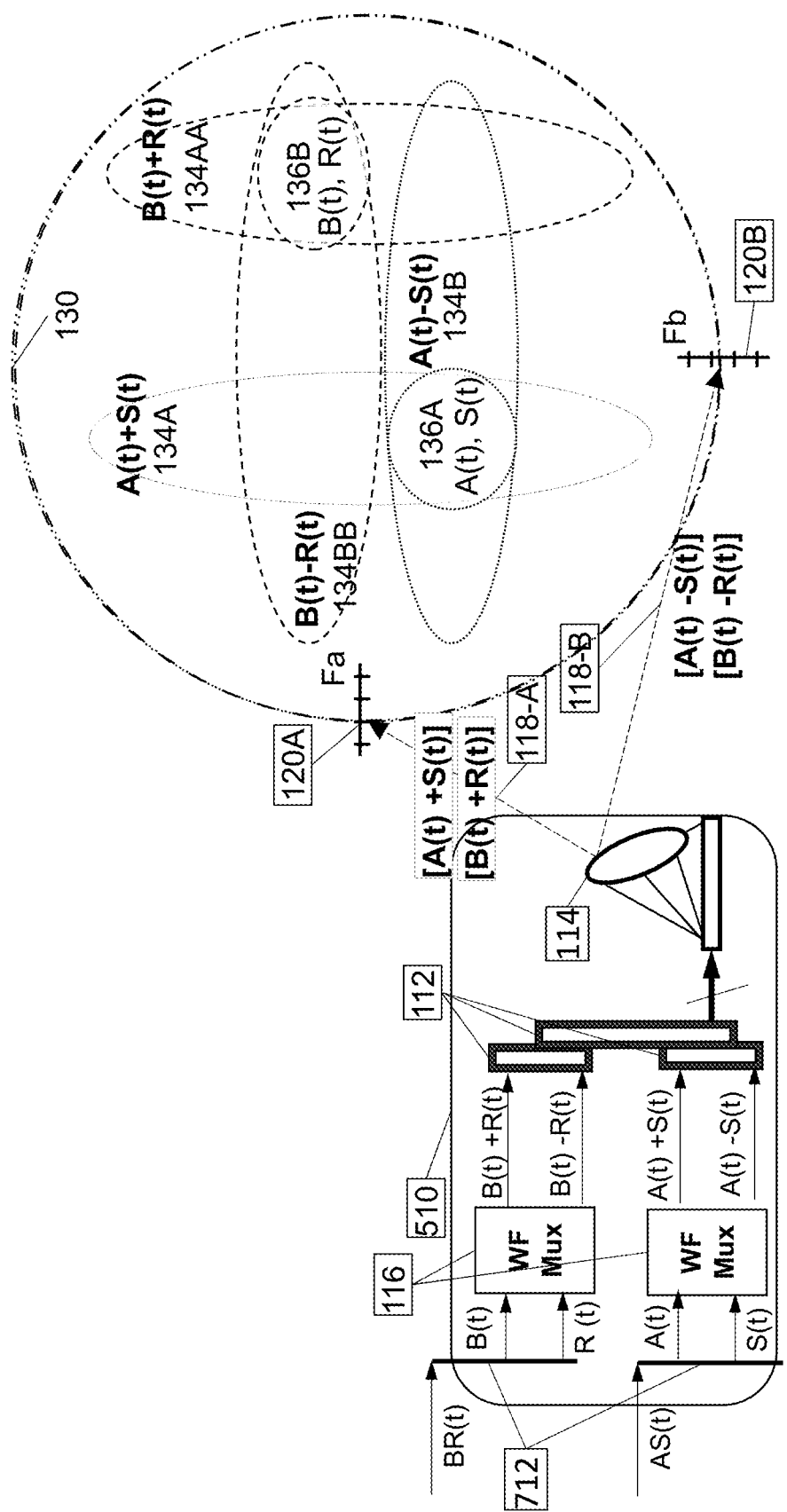
FIG. 6C depicts common coverage areas of two groups of concurrent shaped fan beams in the FOV by both clusters of multiple flying UAVs to function as two linear arrays on sky for forward link data transport as parts of embodiments of this invention. It shows two data sets of transmitted signals to two groups of users independently are preprocessed before uploaded to the linear arrays on sky.

FIG. 6C depicts common coverage areas 136A and 136B of two groups of concurrent shaped fan beams in the FOV by both clusters of multiple flying UAVs to function as two linear arrays on sky 120A and 120B as parts of embodiments of this invention. It depicts a combination of functions and devices shown in FIG. 6A and those shown in FIG. 6B. It also depicts additional segmentation devices 712 converting an input data stream BR(t) into multiple data substreams{B (t), R(t)} as an example.

It shows how two input information data sets AS(t)={A(t), S(t)} and BR(t)={B(t), R(t)} in transmitted signals eventually arrive at two groups of users over in coverage areas 136A and 136B independently. The input signals AS(t) and BR(t) are preprocessed to become {K1(t), K2(t)} and {K3 (t), K4(t)} before uploaded to the linear arrays on sky 120A and 120B. The processing comprises of segmenting 712 such as TDM demultiplexing, and wavefront multiplexing (WF muxing) 116 such as transforming by a 2*2 Hadamard matrix. As a result of the preprocessing, the outputs of the WF muxing 116 are K1(t)=A(t)+S(t), K2(t)=A(t)−S(t), K3(t) =B(t)+R(t), and K4(t)=B(t)−R(t). These four sets of aggregated information data seta are then modulated individually, then processed by remote beam-forming network (RBFN) 112. The outputs are two groups of FDM muxed formats of individual element signals shown in Equation 6. Each of the two FDM muxed formats comprising 8 weighted sums of two signals will be sent to one of the two linear arrays 120A or 120B for re-radiating to user communities. The two signals for the 8 weighted sums as 8 element signals are either a first set of K1(t) and K3(t) for the first linear array 120A or a second set of K2(t) and K4(t) for the second linear array 120B. Various propagation paths from different elements in the linear array either 120A or 120B to a designated coverage enable the radiated powers associated with a specified signal waveform from these elements become coherently combined. Beyond the designated coverage area, the radiated powers of the signal waveform from these elements are combined less effectively or incoherently.

The first linear array 120A in sky only relays or transponds signals associated with information data K1(t) and K3(t). There are not enough information carried from the signals transponded by any one of the two linear array 120A and 120B to recover any of the original information data streams A(t), S(t), B(t), or R(t).

Figure 6D:
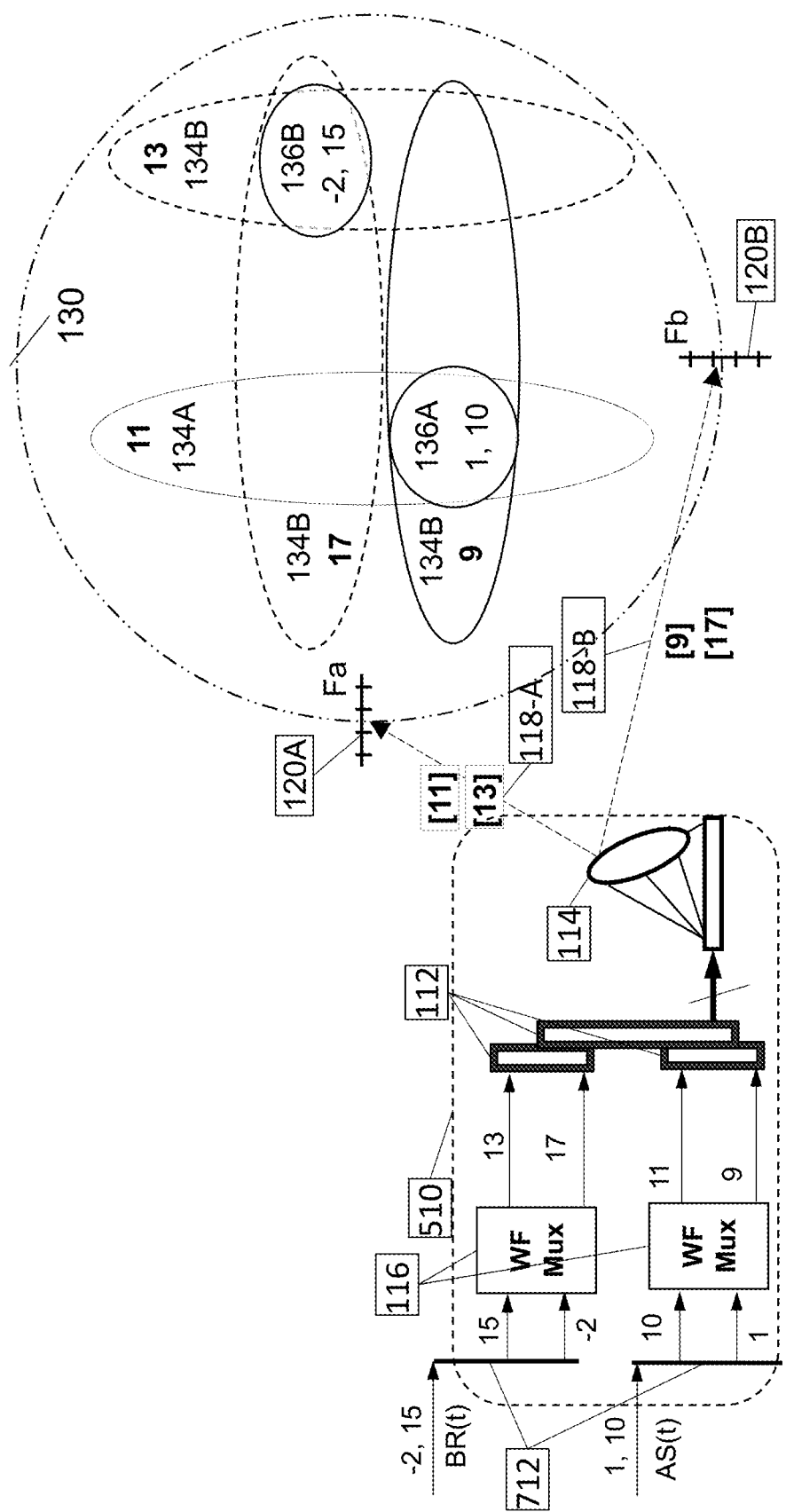
FIG. 6D depicts a numerical example for transmitting data sets in FIG. 6C as parts of embodiments of this invention.

FIG. 6D depicts a numerical example for transmitting data sets in FIG. 6C as parts of embodiments of this invention. The two input information data streams are BR(t)={15, −2, . . . } and AS(t)={10, 1, . . . }; and the segmented data substreams are B(t)={15, . . . }, R(t)={−2, . . . }, A(t)={10, . . . }, and S(t)={1, . . . } after segmenting 712. As a result of the WF muxing 116, the four outputs are muxed information data sets:

$$K3(t)=B(t)+R(t)=\{13, \ldots\},$$

$$K4(t)=B(t)-R(t)=\{17, \ldots\},$$

$$K1(t)=A(t)+R(t)=\{11, \ldots\},$$

$$K2(t)=A(t)-R(t)=\{9, \ldots\}.$$

After individually modulated (not shown), these 4 substreams will be sent through a RBFN 112 converting them to two sets of waveform signals formats which are uploaded via a multibeam antenna 114 to the two linear arrays 120A and 120B individually for transponding and re-radiating different signals to various coverage areas 134A, 134AA, 134B, and 134BB. After receiving waveform signals, users in various coverage shall be able to recover different WF muxed information data streams correspondingly. Users in the crossover coverage area 136A between beam 134A and 134AA, accessible to both WF muxed information data K1(t)={11, . . . } and K2(t)={1, . . . }, can recover data substreams A(t)={10, . . . } and S(t)={1, . . . } accordingly and reconstitute the original information data stream AS(t)={10, 1, . . . }. Similarly, users in the crossover coverage area 136B between beams 134B and 134BB, accessible to both WF muxed information data K3 (t)={13, . . . } and K4(t)={17, . . . }, can recover data substreams B(t)={15, . . . } and R(t)={−2, . . . } accordingly and reconstitute the original information data stream BR(t)={15, −2, . . . }.

Similar concepts can be extended to more than two air-platform-based arrays in sky and using higher order WF muxing such as 4-to-4 or 8-to-8 WF muxing for preprocessing for better privacy and/or survivability via redundancy in data transport.

Figure 7:
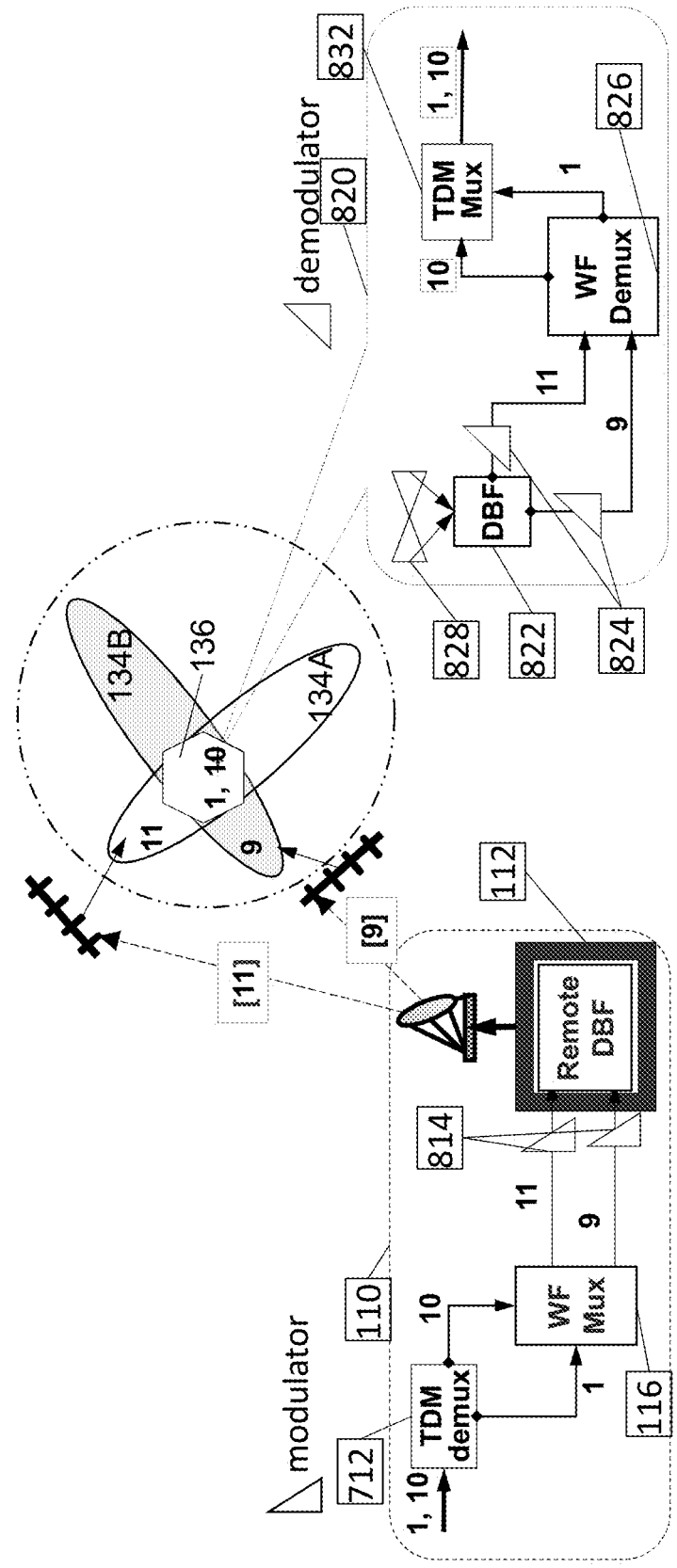
FIG. 7 depicts a numerical example for transmitting data sets in FIG. 1 as parts of embodiments of this invention.

FIG. 7 depicts a numerical example for transmitting data sets in FIG. 1 as parts of embodiments of this invention. The input information data stream is denoted as AS(t)= {10, 1, . . . }; and the segmented data substreams are A(t)={10, ... }, and S(t)={1, ... } after segmenting 712. As a result of the WF muxing 116, the two outputs are muxed information data sets:

$$K1(t)=A(t)+R(t)=\{11, \ldots\},$$

$$K2(t)=A(t)-R(t)=\{9, \ldots\}.$$

After individually modulated (not shown), these 2 wavefront muxed substreams K1(t) and K2(t) will be sent through a RBFN 112 converting them to two waveform signals formats which are uploaded via a multibeam antenna 114 to the two linear arrays 120A and 120B individually for transponding and re-radiating different signals to various coverage areas 134A, and 134B.

Users in various coverage shall be able to recover different WF muxed information data streams correspondingly from received waveform signals delivered by the two linear arrays Fa 120A and Fb 120B. A typical user terminal may comprise of an array antenna and a receiving digital beam forming network 822; which forms two receiving beams aiming for the two linear arrays 120A and 120B in sky. After sending the received signal from the two outputs of the DBF 822 through two demodulators 824, users in the crossover coverage area 136 between beam 134A and 134B, are accessable to both WF muxed information data K1(t)={11, ... } and K2(t)={1, ... }, and thus can recover data substreams A(t)={10, ... } and S(t)={1, ... } via a WF demuxing 826 processor accordingly and reconstitute the original information data stream AS(t)={10, 1, ... } via a de-segmenting or TDM muxing 832 device. The WF demuxing and the TDM muxing are the post processing 802 in the user terminal 820.

Figure 7A:
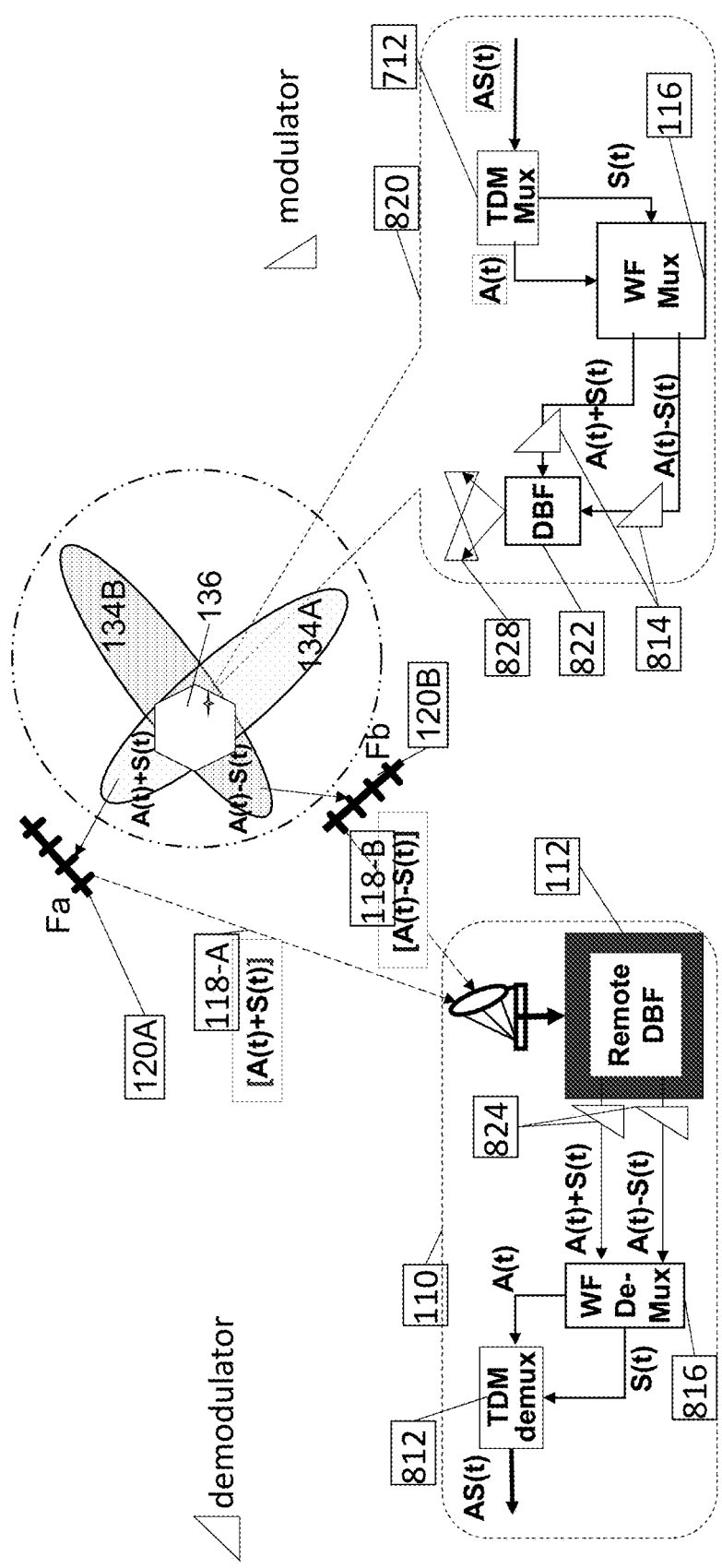
FIG. 7A depicts the same example as shown in FIG. 1, except transmissions are in an incoherent mode for return link data transport.

FIG. 7A depicts the same example as shown in FIG. 1, except transmissions are for return link data transport, in which information data is sent from a transmitting terminal of a user in a common coverage area 136 to a receiving terminal 110 in a ground hub or a remote processing facility via two flying linear arrays on sky by two UAV based platforms Fa 120A and Fb 120B. The wireless communications system for the return link data transport comprises of a receiving terminal 110 in the remote processing facility receiving signals from transmitting terminals 820 through multiple transponding repeaters with linear arrays on UAV based platforms Fa 120A and Fb 120B. The transmitting terminal, located in the common coverage areas 136, is in a first coverage area 134A and also in a second coverage area 134B, and performs a preprocessing on an input information data stream AS(t). The preprocessing comprises of a segmenting function by a device 712 for a TDM mux, and a Wave-front multiplexing 116 function by a 2-to-2 Hadamard transformation. The TDM mux device or the TDM muxer 712 segments the input AS(t) into two segments in outputs A(t) and S(t). The two outputs of the 2-to-2 Hadamard transformation are K1(t)=A(t)+S(t) and K2(t)=A(t)−S(t) which will be modulated by two modulators 814 and become associated waveform signals before beam-forming by a DBF 822 processing and radiated by an antenna 828 to separated destinations, the two transponding platforms Fa 120A and Fb 120B.

The captured signals from the individual elements of the array on sky by the first platforms Fa 120A are multiplexed via a conventional FDM, TDM or CDM scheme which are then overlaid by another WF muxing scheme for easy compensations and dynamic equalization on amplitude and phase delay differentials among back-channels in a feeder-link 118A. For instance, the signal format in the feeder-link 118A, comprising FDM muxed received waveform signals for the receiving elements as expressed in equation (6), is further structured with an overlay of a WF muxing scheme. The signal format in the feeder-link 118A is represented as [A(t)+S(t)]. Similarly, the captured signals from the individual elements of the array on sky by the second platforms Fb 120B are multiplexed via another conventional FDM, TDM or CDM scheme which are then overlaid by a similar WF muxing scheme for easy compensations and dynamic equalization on amplitude and phase delay differentials among back-channels in a feeder-link 118B. For instance, the signal format in the feeder-link 118B may comprises of a FDM muxed received waveform signals for the receiving elements as expressed in equation (6), and is further structured with an overlay of a WF muxing scheme. The signal format in the feeder-link 118B is represented as [A(t)−S(t)].

The captured element signals by the two arrays on the transponding platforms Fa 120A and Fb 120B are then recovered individually in the remote processing facility before the processing of remote DBF 112. The remote DBF 112 shall dynamically steer the first fan beam 134A for the first linear array on the transponding platform Fa 120A to cover a first group of desired users while shall concurrently dynamically move the second fan beam 134B for the second linear array on the transponding platform Fb 120B to cover a second group of desired users. The first transponding repeater 120A relays signals from the first coverage area 134A including associated waveform signals of the first WF muxed information data streams from the common coverage 136, while the second transponding repeaters 120B relays signals from the second coverage area 134B including those associated with the second WF muxed information data streams from the common coverage area 136. The reception antenna patterns of the two linear arrays on sky by the transponding platforms Fa 120A and Fb 120B are optimized dynamically in real time by the remote beam forming 112 in the Rx terminal 110 in the remote processing facility, said receiving terminal further comprising a post-processing unit to perform a wavefront de-multiplexing transformation 816 on two WF-Muxed information data streams, K1(t)=A(t)+S(t) and K2(t)=A(t)−S(t). The two outputs are recovered information data sub-streams A(t) and S(t), which are then de-segmented to reconstitute the original information data set AS(t).

Figure 8:
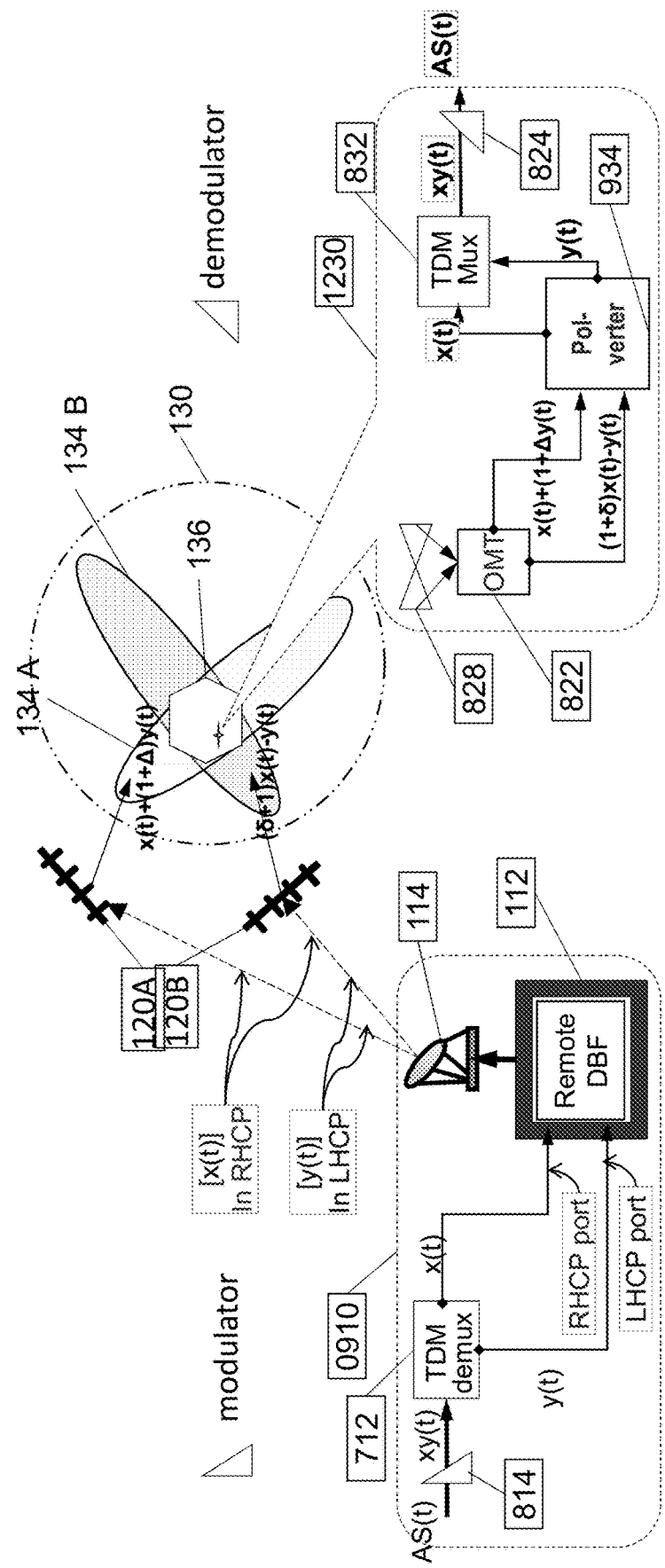
FIG. 8 depicts the same example as shown in FIG. 1, except transmissions are in a coherent mode for forward link data transport.

FIG. 8 depicts the same example as shown in FIG. 1, except transmissions are in a coherent mode, which enable coherent power combining and dynamic resource sharing among two independent signals. The coherent power combining is a function in an advanced user receiver to combine radiating signals by two transponding platforms coherently via wavefront de-multiplexing (WF demuxing) before de-modulations.

The input information data stream is denoted as AS(t)= {10, 1, ... }; and its corresponding waveform signal stream xy(t) is generated after a modulator 814. The waveform signal stream xy(t) is sampled and segmented into two segmented waveform signal substreams or signal substreams x(t) and y(t) by a device performing TDM demuxing 712. The signal substream x(t) is fed to a first input port of a right-hand circularly polarized (RHCP) beam and the signal substream y(t) is fed to a second input port of a left-hand circularly polarized (LHCP) beam of a uplink antenna 114 after x(t) and y(t) are converted to signal formats for remote beam forming 112 by a ground processor in the processing facility 0910. Both the two linear arrays 120A and 120B are within the field of view of the RHCP beam and that of the LHCP beam.

It is important to note that the two linear arrays 120A and 120B maintain the orientation and they operate in two linear polarizations (LP1 and LP2 directions) nearly perpendicular to one-another. We may define a signal z1(t) with its electric field aligned in a North-South direction, as a signal with Horizontal Polarization (HP), while another signal z2(t) as a Vertical Polarization (VP) signal when its electric field aligned in a East-West direction. We shall say LP1 is in the NS direction and LP2 is in the EW direction. A few minutes later, the two slow flying linear arrays 120A and 120B may drift to an orientation such that LP1 is aligned near a direction of NS−Θ while the polarization of LP2 becomes aligned with the direction of EW−Θ±δ, where Θ is an angle between 0° and 90° and δ is generally a positive small angle less than 5°.

The radiated signals x(t) and y(t) in circularly polarized (CP) formats can be re-written in terms of linearly polarized (LP) formats in LP1 and LP2 directions:

$$x(t)\underline{a+} = x(t)(\underline{a1}+\underline{a2})/1.414 \quad (7)$$

$$y(t)\underline{a-} = y(t)(\underline{a1}-i\ \underline{a2})/1.414 \quad (8)$$

where: $\underline{a+}$ stands for a unit vector in a RHCP direction;
$\underline{a-}$ stands for a unit vector in a LHCP direction;
$\underline{a_1}$ stands for a unit vector in a LP1 direction;
$\underline{a_2}$ stands for a unit vector in a LP2 direction.

When x(t) and y(t) in CP formats arrive at the first airborne platform associated with the first linear array 120A concurrently and picked up by a first linear polarized (LP) Ku band aperture in a LP1 direction similar to the one 1312 in FIG. 2A, the received signals are denoted as $r_a(t)$:

$$r_a(t)\underline{a1} = [x(t)\ \exp(jkr_{o1}) + y(t)\ \exp(jkr_{o2})]\underline{a1}/1.414 \quad (8a)$$

Similarly, when x(t) and y(t) in CP formats arrive at the second airborne platform associated with the second linear array 120B concurrently and picked up by another linear polarized (LP) Ku band aperture in a LP2 direction similar to the one 1312 in FIG. 2A, the received signals are denoted as $r_b(t)$:

$$r_b(t)\underline{a2} = i[x(t)\ \exp(jkr_{o3}) - y(t)\ \exp(jkr_{o4})]\underline{a2}/1.414 \quad (8b)$$

We may re-write the equations (8a) and (8b), without the unit directional $\underline{a_1}$ and $\underline{a_2}$ vectors and under idealized conditions assuming $r_{o1}=r_{o2}$ and $r_{o3}=r_{o4}$, as:

$$r_a(t) = [x(t)+y(t)]\exp(jkr_{o2})/1.414 \quad (9a)$$

$$r_b(t)_- = i[x(t)-y(t)]\ \exp(jkr_{o4})/1.414 \quad (9b)$$

For simplicity, we further assume in the example that the linear polarizations of a Ku-band payload and an associated UHF payload are aligned in the same direction on any one of the two airborne platforms Fa and Fb. But the polarizations of the two transponding platforms Fa and Fb are perpendicular to each other. The polarization on the first transponding platform Fa is in the direction of LP1, while that of the second transponding platform Fb is in the direction of LP2.

In other embodiments, the polarizations of Ku-band and UHF payload may not be aligned but with a known angular offset among the two polarization directions.

In our example, it is noticed that x(t) is distributed as a first wavefront vector of [1, i] among the two transponding platforms Fa and Fb, where the first one, Fa, featuring the first linear array 120A with the polarization orientation in LP1 direction and the second one, Fb, with the second linear array 120B with the polarization orientation in LP2 direction. Similarly, y(t) is associated with a distribution of a second wavefront vector [1, −i] on these two relay platforms associated with the two linear arrays 120A and 120B.

A wavefront multiplexing process has taken placed when the two CP signals, x(t) and y(t) propagating in Ku band from the ground uplink antenna 114 to the LP receiving apertures of the two transponding platforms Fa and Fb. RHCP signals will be picked up by both transponding platforms Fa and Fb, and LHCP signals will also be picked up by the two platforms concurrently. After path length equalization, a RHCP signal, x(t), shall arrive at the first LP transponding platform Fa in a LP1 polarization with a 90° time-phase-advanced to that at the second LP transponding platform Fb in a LP2 polarization. Thus x(t) is distributed as (1, i) between the two LP transponding platforms Fa and Fb as depicted in Equations (9a) and (9b). Similarly, a LHCP signal, y(t), will arrive at the first LP transponding platform Fa in the LP1 polarization with a 90° time-phase-delayed to that at the second LP transponding platform Fb in at the LP2 polarization. Thus, the distribution of y(t) is (1, −i) between the two LP transponding platforms Fa and Fb as depicted in Equations (9a) and (9b).

The formulation for idealized scenarios becomes nearly identical to Equation (4a) in the US patent with a patent number U.S. Pat. No. 8,538,326 B2. The optimization techniques presented in the patent can be used in here for non-idealized scenarios, compensating and equalized amplitude and phase differentials due to dynamic propagation effects and unequaled or calibrated electronics effects due to operation conditions including aging. The dynamic optimization functions will be carried out by the box 934, which may be implemented as a part a digital Polverter. Polverter stands for a polarization converter and will do both dynamic equalization followed by a wavefront de-multiplexing (WF demuxing)

In a ground terminal over the common coverage area 136, a tracking antenna with dual LP receiving capability is oriented to dynamically align a first receiving port to the LP1 direction for receiving signals from the first linear array 120A and the second receiving port is nearly aligned to LP2 polarization direction of the second linear array 120B. The polarization demuxing is implemented via an "ortho-mode-T" (OMT) device 822. The two outputs from the OMT are sent to a device for post processing 934. One way of implementing the post-processing function is through a digital "Polverter". Polverter 934 stands for a polarization converter and will do both dynamic equalization followed by a wavefront de-multiplexing (WF demuxing). The WF demuxed outputs x(t) and y(t) may be de-segmented by a functional device 832 performing TDM mux to become a waveform signal stream xy(t), from which the information data stream AS9t) is recovered via a convention demodulation process.

In comparison of the operational concepts, FIG. 1 depicting a communication system with WF muxing in an incoherent mode features the WF muxing and demuxing are on information data streams, while FIG. 8 depicting a communication system with WF muxing in a coherent mode features the WF muxing and demuxing on waveform signal streams or simply signals. WF muxing/demuxing in an incoherent mode is aiming for data transport applications with enhanced privacy and better survivability through redundancy. On the other hand, WF muxing/demuxing in a coherent mode is aiming for data transport applications with better SNR via coherent power combining in a receiver and dynamic resource allocations for better frequency or power sharing among multiple users.

The invention claimed is:

1. A communication system comprising:
a first airborne linear array configured to project a first fan beam over a first ground coverage elongated in a first direction, the first fan beam delivering a first information data associated with a first data stream; and
a second airborne linear array configured to project a second fan beam over a second ground coverage elongated in a second direction, the second fan beam delivering a second information data associated with a second data stream,
wherein the first and second ground coverages are overlapped to form a common coverage area,
wherein the first and second data streams are complementary to each other and are linear combinations of a plurality of segmented substreams,
wherein the plurality of segmented substreams is formed from an information data stream, and
wherein the first and second data streams are generated from a ground control facility.

2. The communication system of claim 1 wherein the first and second directions are nearly perpendicular to each other or offset from each other.

3. The communication system of claim 1 wherein: (1) the plurality of segmented substreams has first and second segmented substreams, (2) the first data stream is a sum of the first and second segmented substreams, and (3) the second data stream is a difference of the first and second segmented substreams.

4. The communication system of claim 1 further comprising:
a user terminal configured to receive signals from the common coverage area to reconstitute the information data stream, the signals including first and second information data.

5. The communication system of claim 4 wherein the user terminal comprises:
a digital beamformer (DBM) configured to form first and second beams that are orthogonal to each other to receive the signals; and
a demodulator configured to demodulate the received signals to generate the first and second data streams.

6. The communication system of claim 5 wherein the first and second airborne linear arrays are carried by a plurality of unmanned aerial vehicles (UAVs) in first and second UAV platforms.

7. The communication system of claim 6 wherein: (1) the first beam has a first radiation pattern having a peak pointed to the first UAV platform and a null pointed to the second UAV platform, and (2) the second beam has a second radiation pattern having a null pointed to the first UAV platform and a peak pointed to the second UAV platform.

8. The communication system of claim 5 wherein the first and second data streams are generated by a wavefront multiplexing transform.

9. The communication system of claim 8 wherein the user terminal comprises:
a wavefront demultiplexer device to perform a wavefront demultiplexing transform on the first and second data streams to generate the plurality of segmented substreams including first and second segmented substreams; and
a desegmenter to desegment the first and second segmented substreams into the information data stream, wherein the wavefront demultiplexing transform is an inverse of the wavefront multiplexing transform.

10. The communication system of claim 1 wherein the ground control facility comprises:
a segmenter to segment the information data stream into the plurality of segmented substreams; and
a wavefront multiplexer device to perform a wavefront multiplexing transform on the plurality of segmented substreams to generate a plurality of data streams including first and second data streams.

11. A method comprising:
projecting a first fan beam over a first ground coverage elongated in a first direction by a first airborne linear array, the first fan beam delivering a first information data associated with a first data stream; and
projecting a second fan beam over a second ground coverage elongated in a second direction by a second airborne linear array, the second fan beam delivering a second information data associated with a second data stream,
wherein the first and second ground coverages are overlapped to form a common coverage area,
wherein the first and second data streams are complementary to each other and are linear combinations of a plurality of segmented substreams,
wherein the plurality of segmented substreams is formed from an information data stream, and
wherein the first and second data streams are generated from a ground control facility.

12. The method of claim 11 wherein the first and second directions are nearly perpendicular to each other or offset from each other.

13. The method of claim 11 wherein: (1) the plurality of segmented substreams has first and second segmented substreams, (2) the first data stream is a sum of the first and second segmented substreams, and (3) the second data stream is a difference of the first and second segmented substreams.

14. The method of claim 13 further comprising:
receiving signals from the common coverage area to reconstitute the information data stream, the signals including first and second information data.

15. A communication system comprising:
a first airborne linear array configured to project a first fan beam over a first ground coverage elongated in a first direction, the first fan beam delivering a first linearly polarized signal; and
a second airborne linear array configured to project a second fan beam over a second ground coverage elongated in a second direction, the second fan beam delivering a second linearly polarized signal,
wherein the first and second ground coverages are overlapped to form a common coverage area, and
wherein the first and second linearly polarized signals are obtained from first and second circularly polarized signals generated from an information data stream.

16. The communication system of claim 15 wherein the first and second directions are nearly perpendicular to each other.

17. The communication system of claim 15 wherein the first and second first linearly polarized signals are in horizontal polarization (HP) and vertical polarization (VP), respectively.

18. The communication system of claim 15 wherein the first and second circularly polarized signals are in right-hand circular polarization (RHCP) and left-hand circular polarization (LHCP), respectively.

19. The communication system of claim 15 further comprising:
- a ground terminal configured to receive the first and second linearly polarized signals from the common coverage area to reconstitute the information data stream.

20. The communication system of claim 19 wherein the ground terminal comprises:
- first and second receiving ports configured to be nearly aligned with the first and second directions to provide first and second received signals;
- an ortho-mode device configured to demux the first and second received signals to generate the first and second output signals; and
- a polarization converter configured to recover the information data stream from the first and second output signals.

* * * * *